United States Patent [19]

Koya et al.

[11] Patent Number: 5,424,442
[45] Date of Patent: Jun. 13, 1995

[54] WATER-SOLUBLE METHINE COMPOUNDS USEFUL IN PHOTOGRAPHIC SILVER HALIDE EMULSION CONTAINING THE SAME

[75] Inventors: Keizo Koya; Toshinao Ukai; Haruo Takei, all of Kanagawa, Japan

[73] Assignee: Fuji Photo Film Co., Ltd., Kanagawa, Japan

[21] Appl. No.: 78,110

[22] Filed: Jun. 18, 1993

Related U.S. Application Data

[62] Division of Ser. No. 686,974, Apr. 18, 1991, Pat. No. 5,250,692.

[30] Foreign Application Priority Data

Apr. 20, 1990 [JP] Japan .................. 2-103108

[51] Int. Cl.⁶ .......................................... C07D 277/62
[52] U.S. Cl. .................................. 548/156; 544/310;
546/94; 546/165; 546/175; 546/270; 546/278;
546/280; 548/121; 548/146; 548/152; 548/157;
548/159; 548/181; 548/199; 548/252
[58] Field of Search ............. 546/140, 152, 198, 209,
546/270, 94, 165, 175, 278, 280; 548/146, 150,
152, 199, 181, 290, 121, 157, 159, 156; 544/130

[56] References Cited

U.S. PATENT DOCUMENTS

| | | | |
|---|---|---|---|
| 2,388,963 | 11/1945 | Fry | 260/240 |
| 2,493,748 | 1/1950 | Brooker | 260/240 |
| 2,504,468 | 4/1950 | Thompson | 260/240 |
| 2,556,515 | 6/1951 | Brooker | 260/240.7 |
| 3,384,486 | 5/1968 | Taber | 96/74 |
| 4,800,154 | 1/1989 | Okazaki | 430/570 |
| 5,015,561 | 5/1991 | Hayashi | 430/487 |
| 5,091,298 | 2/1992 | Parton | 430/570 |
| 5,116,722 | 5/1992 | Callant | 430/363 |
| 5,250,692 | 10/1993 | Koya | 546/146 |

*Primary Examiner*—Michael L. Shippen

*Attorney, Agent, or Firm*—Sughrue, Mion, Zinn, Macpeak & Seas

[57] ABSTRACT

A water-soluble methine compound represented by the following general formula (I):

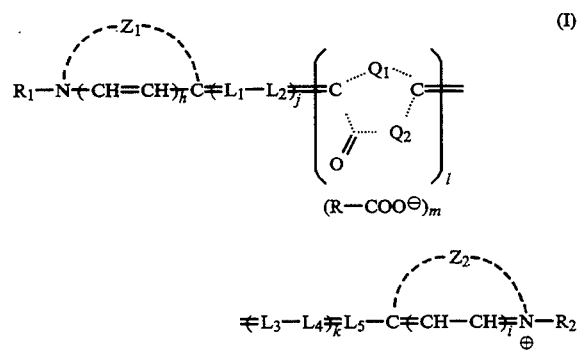

wherein $Z_1$ and $Z_2$, which may be the same or different, each represents a non-metallic atomic group required for forming a 5-membered or 6-membered nitrogen-containing heterocyclic ring; $R_1$ and $R_2$, which may be the same or different, each represents an alkyl group; $Q_1$ and $Q_2$ each represents an atomic group required, in combination, for forming a 4-thiazolidinone ring, a 5-thiazolidinone ring, a 4-imidazolidinone ring, a 4-oxazolidinone ring, a 5-oxazolidinone ring, a 5-imidazolidinone ring or a 4-dithiolanone ring; $L_1$, $L_2$, $L_3$, $L_4$ and $L_5$, which may be the same or different, each represents a methine group; R represents a hydrogen atom, an alkyl group, an aryl group or a heterocyclic group; m represents 1 or 2; i and h each represents 0 or 1; l represents 1 or 2; and j and k each represents 0, 1, 2 or 3.

A photographic silver halide emulsion containing said methine compound added in the form of an aqueous solution is also disclosed.

6 Claims, No Drawings

WATER-SOLUBLE METHINE COMPOUNDS USEFUL IN PHOTOGRAPHIC SILVER HALIDE EMULSION CONTAINING THE SAME

This is a divisional of application Ser. No. 07/686,974, filed Apr. 18, 1991, now U.S. Pat. No. 5,250,692.

FIELD OF TEE INVENTION

This invention relates to a methine compound represented by general formula (I). The compound is soluble in water and thus eliminates the need to use organic solvents and other solubilizing additives upon use. This invention also relates to a photographic silver halide emulsion which can be formed by adding the compound of formula (I) in the form of an aqueous solution without using an organic solvent and/or a solubilizing additive.

BACKGROUND OF THE INVENTION

Spectral sensitizing techniques (that is, methods for expanding the light-sensitive wavelength regions of light-sensitive materials to the visible region and optionally further to the infrared region) are known. In this manner, the materials are made sensitive to light having a sufficiently long wavelength when photographic materials are prepared.

When spectral sensitizing dyes are added to photographic silver halide emulsions, the adsorption state thereof on the surface of silver halide crystals greatly varies, depending to a large extent on the addition conditions; in other words, changes in the conditions under which the dye is added to the emulsion affects absorption state. In turn, absorption state has a great influence on photographic effects such as fogging effect, sensitivity, spectral sensitivity distribution, desensitization and the stability of sensitivity. This is fully described in C.E.K. Mees, *The Theory of the Photographic Process*, Second Edition, chapter 12, pages 430-500 (Macmillan 1954).

Generally, most spectral sensitizing dyes for photographic silver halide emulsions are substantially insoluble in water. Hence, the spectral sensitizing dyes are usually added to the photographic silver halide emulsion by methods wherein the dyes are dissolved in organic solvents miscible with water, such as acetone, methanol, ethanol, propanol, methyl cellosolve and pyridine and then added to the emulsions. Optionally, a part of the organic solvent is replaced by water, and a mixture of the organic solvent and water is used. In addition, examples of methods for adding the spectral sensitizing dyes to the photographic silver halide emulsion include a method wherein a strong acid is added to a sensitizing dye having amidinium ion chromophore to protonate it and an aqueous solution thereof is added as described in JP-B-44-23389 (the term "JP-B" as used herein means an "examined Japanese patent publication"); and a method wherein a sensitizing dye which is substantially insoluble in water is mixed with a colloid of a volatile solvent and the mixture is heated to remove the solvent, thus dispersing the dye in the hydrophilic colloid as described in JP-B-44-22948.

However, these methods have various disadvantages. First, the methods wherein the dyes are dissolved in the organic solvents which are miscible with water and then the resulting solutions are added to the emulsion, have the following disadvantages. The organic solvents used cause a lowering in the surface activity of co-present coating aids, the coagulation of binders or the lumping of co-present couplers in the case of color photographic materials. This creates a difficulty in carrying out high-speed coating, such as coating at a rate of 100 m/min or higher. Further, when the solutions are added, the organic solvents used are immediately mixed with water so that there is a possibility that the sensitizing dyes are adsorbed by binders before they are adsorbed by silver halide crystals, or the dyes themselves may agglomerate together in which case only low-intensity spectral sensitivity can be imparted. In addition, the methods using the organic solvents are not preferred from the viewpoint of safety, in view of their volatility. Further, the method described in JP-B-44-23389 is not preferred from the viewpoint of the stability of the dyes, because the aqueous solution is made strongly acidic. The method wherein the dyes are dispersed in hydrophilic colloid as described in JP-B-44-22948 requires the use of organic solvents and hence has disadvantages described above in the case of the use of the organic solvents.

As alternative methods using no organic solvent, attempts have been made to add an aqueous dispersion of photographic additive to silver halide emulsions, the aqueous dispersion of photographic additive being obtained by dispersing photographic additive in the presence of a wetting agent or a dispersant in an aqueous solution. For example, the following methods are known.

JP-A-52-110012 (the term "JP-A" as used herein means an "unexamined published Japanese patent application") discloses a method wherein a sensitizing dye is crushed in the presence of a dispersant (surfactant) having a constant surface tension in an aqueous phase, water is removed from the resulting dispersion and the dye is dried and added as such to silver halide emulsions, or the dye is dispersed in water or an aqueous gelatin solution and the dispersion is added to silver halide emulsions.

JP-A-53-102733 discloses a method wherein a homogeneous mixture (pasty mixture) comprising photographic fine additive particles, a dispersant such as sorbitol and a binder such as gelatin is prepared and processed into noodle which is then dried with hot air, and the resulting powder is added to a photographic aqueous colloid coating composition.

U.S. Pat. No. 4,006,025 discloses a method wherein a spectral sensitizing agent is mixed with water to form a slurry, the temperature thereof is elevated to 40 to 50° C., the slurry is homogenized or milled in the presence of a surfactant to uniformly disperse the spectral sensitizing agent in water and the resulting dispersion is added to silver halide emulsions.

Any of these methods is a method wherein photographic additives, such as spectral sensitizing agents, are dispersed in an aqueous system without using any organic solvent. However, these methods have the following practical problems. Since the aqueous dispersion is powdered by lyophilization, etc., the time required for the adsorption of the photographic additives such as the spectral sensitizing agent on silver halide is prolonged and hence the desired photographic sensitivity can not be obtained in a short time. Further, when such emulsions are coated, coating troubles are liable to be caused by precipitates, etc. Furthermore, since a wetting agent or a dispersant is used during the course of the dispersion of the photographic additives, this causes problems in that emulsions in the silver halide emulsions are broken, adverse effects are caused, for example, coating troubles are increased with the high-speed coating of silver halide emulsions and the adhesion of the resulting silver halide photographic materials is poor. These problems are obviously detrimental to products. Thereafter, an improved method described in JP-A-58-105141 was proposed. This method is a method wherein a water-insoluble compound is mechanically ground in an aqueous system at pH of 6 to 8 at a temperature of 60° C. to 80° C. to obtain finely divided particles having a particle size of up to 1 μm and the resulting dispersion is added to a photographic emulsion. However, this method still has such problem that the desired photographic performance can not be obtained, even though considerable steps are taken to prepare the photographic material.

Recently, there has been proposed a method wherein cyclodextrin and ether derivatives thereof are co-present as means for forming an aqueous solution of a spectral sensitizing dye without using any organic solvent or strong acid as described in JP-A-62-215261. In this method, conventional spectral sensitizing dyes which are substantially insoluble in water are made slightly soluble in water to prepare photographic silver halide emulsions. However, expensive cyclodextrin derivatives are used and hence costs are increased. In addition, since cyclodextrin derivatives which are used may have deleterious effects on photographic performance (e.g., a lowering in sensitivity and the deterioration of the quality of layers), this method also has problems.

That the spectral sensitizing dyes which are substantially insoluble in water are solubilized and then added to the emulsion is a very significant problem in the preparation of photographic materials. Particularly, many cationic cyanine dyes have generally low solubility in water. The introduction of water-soluble groups, particularly dissociatable water-soluble groups (e.g., sulfo group, phosphoric acid group) into the molecules of these dyes has been often carried out to increase water solubility. Even when water solubility is improved, the desired photographic characteristics can not be obtained, because the properties of the compounds are varied. Accordingly, there is a substantial difficulty in adding the cationic cyanine dyes to aqueous systems.

Compounds belonging to the class of cationic cyanine dyes include dyes having 4-thiazolidinone ring, 5-thiazolidinone ring, 4-imidazolidinone ring, 5-inidazolidinone ring, 4-oxazolidinone ring, 5-oxazolidinone ring or 4-dithiolanone on a methine chain. These dyes are useful as spectral sensitizing agents for photographic silver halide emulsions and are often used in practice (see E. B. Knott, R. H. Jeffreys, *J. Chem. Soc.*, 4762 (1952), ibid., 949 (1955)). These dyes can be used for spectral sensitization for a silver halide photographic light-sensitive material in the same manner as that of dyes as described in U.S. Pat. No. 3,674,499, JP-B-49-13331, JP-A-51-106425, JP-B-48-21564, Belgian Patent 532,028 and JP-A-54-18726. These dyes have very low solubility in water. Hence, use of these dyes leads to the above-mentioned problems, and these problems are unfavorable for the preparation of photographic materials.

SUMMARY OF THE INVENTION

An object of the present invention is to provide a novel methine compound represented by general formula (I), which is soluble in water.

Another object of the present invention is to provide a photographic silver halide emulsion containing the methine compound represented by general formula (I), which is formed by adding the compound in the form of an aqueous solution.

Accordingly, the present invention provides in one aspect a novel methine compound represented by formula (I):

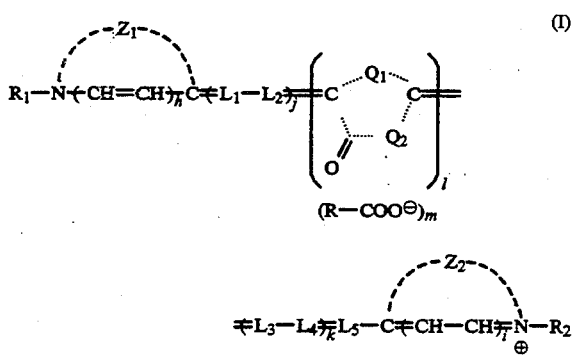

wherein $Z_1$ and $Z_2$, which may be the same or different, each represents a non-metallic atomic group required for forming a five-membered or six-membered nitrogen-containing heterocyclic ring; $R_1$ and $R_2$, which may be the same or different, each represents an alkyl group; $Q_1$ and $Q_2$ each represents an atomic group required, in combination, for forming a 4-thiazolidinone ring, a 5-thiazolidinone ring, a 4-imidazolidinone ring, a 4-oxazolidinone ring, a 5-oxazolidinone ring, a 5-imidazolidinone ring or a 4-dithiolanone ring; $L_1$, $L_2$, $L_3$, $L_4$ and $L_5$, which may be the same or different, each represents a methine group; R represents a hydrogen atom, an alkyl group, an aryl group or a heterocyclic group; m represents 1 or 2; i and h each represents 0 or 1; l represents 1 or 2; and j and k each represents 0, 1, 2 or 3.

The present invention provides in another aspect a photographic silver halide emulsion which contains the methine compound represented by general formula (I), which is formed by adding the compound in the form of an aqueous solution.

DETAILED DESCRIPTION OF THE INVENTION

The compound represented by general formula (I) will be illustrated in more detail below.

The alkyl group represented by $R_1$ and $R_2$ includes straight-chain, branched-chain and cyclic alkyl groups, as well as unsaturated alkyl groups. Also, any of these alkyl groups may be substituted.

Preferably, $R_1$ and $R_2$ are each an unsubstituted alkyl group having up to 18 carbon atoms (e.g., methyl group, ethyl group, propyl group, butyl group, pentyl group, octyl group, decyl group, dodecyl group, octadecyl group, etc.). Examples of the cyclic alkyl group include cyclopropyl group, cyclopentyl group and cyclohexyl group.

Examples of the unsaturated alkyl group include vinyl group, vinylmethyl group, 2-butenyl group, 3-butenyl group and 3-hexenyl group.

Examples of the branched-chain alkyl group include isobutyl group, 4-methylpentyl group and 2-ethylhexyl group.

Further, $R_1$ and $R_2$ are also preferably each a substituted alkyl group having up to 18 carbon atoms. Preferred examples of substituent groups for the substituted alkyl group include carboxyl group, cyano group, halogen (e.g., fluorine atom, chlorine atom, bromine atom), hydroxyl group, an alkoxycarbonyl group having up to 8 carbon atoms (e.g., methoxycarbonyl group, ethoxycarbonyl group, phenoxycarbonyl group, benzyloxycarbonyl group, etc.), an alkoxy group having up to 8 carbon atoms (e.g., methoxy group, ethoxy group, benzyloxy group, phenethyloxy group, etc.), a monocyclic aryloxy group having up to 10 carbon atoms (e.g., phenoxy group, p-tolyloxy group, etc.), an acyloxy group having up to 8 carbon atoms (e.g., acetyloxy group, propionyloxy group, etc.), an acyl group having up to 8 carbon atoms (e.g., acetyl group, propionyl group, benzoyl group, mesyl group, etc.), a carbamoyl group (e.g., carbamoyl group, N,N-dimethylcarbamoyl group, morpholinocarbonyl group, piperidinylcarbonyl group, etc.), a sulfamoyl group (e.g., sulfamoyl group, N,N-dimethysulfamoyl group, morpholinosulfamoyl group, piperidinosulfamoyl group, etc.) and an aryl group having up to 10 carbon atoms (e.g., phenyl group, 4-chlorophenyl group, 4-methylphenyl group, α-naphthyl group).

The alkyl group represented by $R_1$ and $R_2$ more preferably has 1 to 18 carbon atoms.

$Z_1$ and $Z_2$ each represents a non-metallic atomic group required for forming a five-membered or six-membered nitrogen-containing heterocyclic ring. Preferred examples of the ring include a thiazole nucleus (e.g., thiazole, 4-methylthiazole, 4-phenylthiazole, 5-methylthiazole, 5-phenylthiazole, 4,5-dimethylthiazole, 4,5-diphenylthiazole, 4-(2-thienyl)thiazole,), a benzothiazole nucleus (e.g., benzothiazole, 4-chlorobenzothiazole, 5-chlorobenzothiazole, 6-chlorobenzothiazole, 7-chlorobenzothiazole, 4-methylbenzothiazole, 5-methylbenzothiazole, 6-methylbenzothiazole, 5,6-dimethylbenzothiazole, 5-bromobenzothiazole, 6-bromobenzothiazole, 5-iodobenzothiazole, 5-trifluoromethylbenzothiazole, 5-phenylbenzothiazole, 4-methoxybenzothiazole, 5-methoxybenzothiazole, 6-methoxybenzothiazole, 5-carboxybenzothiazole, 5-cyanobenzothiazole, 5-fluorobenzothiazole, 5-ethoxybenzothiazole, tetrahydrobenzothiazole, 5,6-dimethoxybenzothiazole, 5-hydroxybenzothiazole, 6-hydroxybenzothiazole, 5,6-dihydroxybenzothiazole, etc.), a naphthothiazole nucleus (e.g., naphtho (1,2-d)thiazole, naphtho [2,1-d]thiazole, naphtho-[2,3-d]thiazole, 5-methoxynaphtho[2,1-d]thiazole, 5-ethoxynaphtho [2,1-d]thiazole, 8-methoxynaphtho [1,2-d]thiazole, 7-methoxynaphtho[1,2-d]thiazole, 8,9-dihydronaphtho [1,2-d]thiazole, etc.), an oxazole nucleus (e.g., 4-methyloxazole, 5-methyloxazole, 4-phenyloxazole, 4,5-diphenyloxazole, 4-ethyloxazole, 4,5-dimethyloxazole, 5-phenyloxazole, etc.), a benzoxazole nucleus (e.g., benzoxazole, 5-chlorobenzoxazole, 5-methylbenzoxazole, 5-phenylbenzoxazole, 6-methylbenzoxazole, 5,6-dimethylbenzoxazole, 4,6-dimethylbenzoxazole, 5-methoxybenzoxazole, 5-ethoxybenzoxazole, 5-fluorobenzoxazole, 6-methoxybenzoxazole, 5-hydroxybenzoxazole, 6-hydroxybenzoxazole , etc.) , a naphthoxazole nucleus (e.g., naphtho [1,2-d]oxazole, naphtho[2,1-d]oxazole, naphtho[2,3-d]oxazole, etc. ), a selenazole nucleus (e.g., selenazole, 4-methylselenazole, 4-phenylselenazole, 4,5-diphenylselenazole, etc.), a benzoselenazole nucleus (e.g., benzoselenazole, 5-chlorobenzoselenazole, 5-methylbenzoselenazole, 5-methoxybenzoselenazole, 5-phenylbenzoselenazole, etc.), a naphthoselenazole nucleus (e.g., naphtha[1,2-d]selenazole, naphtho[2,1-d]selenazole, naphtho[2,3-d]selenazole, etc.), a tellurazole nucleus (e.g., benzotellurazole, 5-methylbenzotellurazole, 5,6-dimethylbenzotellurazole, naphtho[1,2-d]tellurazole, naphtho[2,1-d]tellurazole, naphtho[2,3-d]tellurazole, 6-methoxynaphtho[1,2-d]tellurazole, etc.), a thiazoline nucleus (e.g., thiazoline, 4-methylthiazoline, 4-phenylthiazoline, etc.), an oxazoline nucleus (e.g., 5,5-dimethyloxazoline etc.), an isoxazole nucleus (e.g., 5-methylisoxazole, etc.), a benzisoxazole nucleus (e.g., benzisoxazole, etc.), a 3,3-dialkylindolenine nucleus (e.g., 3,3-dimethylindolenine, 3,3,5-trimethylindolenine, 5-chloro-3,3-dimethylindolenine, 5-ethoxycarbonyl-3,3-dimethylindolenine, 4,5-benzo-3,3-dimethylindolenine, 6,7-benzo-3,3-dimethylindolenine, etc.), a 2-pyridine nucleus (e.g., pyridine, 5-methylpyridine, etc.), a 4-pyridine nucleus (e.g., pyridine, etc.), a 2-quinoline nucleus (e.g., 6-ethoxyquinoline, 6-ethylquinoline, 6-chloroquinoline, 8-fluoroquinoline, etc.), a 4-quinoline nucleus (e.g., 8-methylquinoline, 8-fluoroquinoline, 6-chloroquinoline, etc.), a 1-isoquinoline nucleus (e.g., isoquinoline, etc.), a naphthridine nucleus (e.g., 7-methyl-1,8-naphthridine, 8-methyl-1,5-naphthridine, etc.), a tetrazole nucleus (e.g., methyltetrazole, ethyltetrazole, phenyltetrazole, etc. ), an imidazo[4,5-b]quinoxaline nucleus (e.g., 1-ethylimidazo[4,5-b]quinoxaline, 1-methylimidazo[4,5-b]quinoxaline, 1-phenylimidazo[4,5-b]quinoxaline, 1-(2-methoxyethyl)imidazo[4,5-b]quinoxaline, 6-chloro-1-butylimidazo[4,5-b]quinoxaline, etc.) and a 4,9-dioxo-4,9-dihydronaphtho[2,3-d]imidazole nucleus (e.g., 1-butyl-4,9-dioxonaphtho[2,3-d]imidazole, 1-(2-methypropyl)-4,9-dioxonaphtho[2,3-d]imidazole,).

$L_1$, $L_3$, $L_4$ and $L_5$ each represents a methine group, which includes substituted methine groups and the case where a ring is formed on the methine chain. Preferred examples of substituent groups include an alkyl group having 1 to 4 carbon atoms (e.g., methyl group, ethyl group, propyl group, butyl group, etc.), an aryl group having 6 to 10 carbon atoms (e.g., phenyl group, 2-carboxyphenyl group, 4-methylphenyl group, 2-chlorophenyl group, etc.), a substituted alkyl group having 1 to 9 carbon atoms (e.g., chloromethyl group, benzyl group, 2-phenylethyl group, 3-phenylpropyl group, methoxyethyl group, etc.), an alkoxy group having 1 to 6 carbon atoms (e.g., methoxy group, ethoxy group, butoxy group, hexyloxy group, etc.) and an aryloxy group having 6 to 12 carbon atoms (e.g., phenoxy group, 4-chlorophenoxy group, 4-methylphenoxy group, naphthoxy group, etc.). It is also preferred that substituent groups for $L_1$, $L_2$, $L_3$, $L_4$ and $L_5$ combine together to form a five-membered or six-membered ring on methine chain.

Also preferred is the case where substituent groups for $L_1$ and $L_2$ and $R_1$ and/or substituent groups for $L_3$, $L_4$ and $L_5$ and $R_2$ combine together to form a five-membered or six-membered ring.

The alkyl group represented by R includes straight-chain, branched-chain and cyclic alkyl groups, as well as unsaturated alkyl groups, any of which may be substituted. When R is an unsubstituted alkyl group, an alkyl group having up to 22 carbon atoms is preferred. Examples of the unsubstituted alkyl group include methyl group, ethyl group, propyl group, butyl group, pentyl group, heptyl group, undecanyl group, heptadecanyl group and heneicosanyl group. Examples of the cyclic alkyl group include cyclopropyl group, cyclopentyl group, cyclohexyl group, decahydronaphthyl group and cholestanyl group.

Examples of the unsaturated alkyl group include 1-propenyl group, vinyl group, 8-heptadecenyl group, 3-cyclohexenyl group and 1,3-heptadienyl group.

Examples of the branched-chain alkyl group include 2-methylpropyl group, 4-methylpentyl group and 2-ethylhexyl group.

Preferred substituted alkyl groups include a substituted alkyl group having an alkyl portion having up to 22 carbon atoms. Preferred examples of substituent groups include carboxyl group, cyano group, halogen (e.g., fluorine atom, chlorine atom, bromine atom), hydroxyl group, an alkoxycarbonyl group having up to 8 carbon atoms (e.g., methoxycarbonyl group, ethoxycarbonyl group, phenoxycarbonyl group, benzyloxycarbonyl group, etc.), an alkoxy group having up to 8 carbon atoms (e.g., methoxy group, ethoxy group, benzyloxy group, phenethyloxy group, etc.), a monocyclic aryloxy group having up to 10 carbon atoms (e.g., phenoxy group, p-tolyloxy group, etc.), an acyloxy group having up to 8 carbon atoms (e.g., acetyloxy group, propionyloxy group, etc.), an acyl group having up to 10 carbon atoms (e.g., acetyl group, propionyl group, benzoyl group, naphthoyl group, mesyl group, etc.), a carbamoyl group (e.g., carbamoyl group, N,N-dimethylcarbamoyl group, morpholinocarbonyl group, piperidinocarbonyl group, etc.), a sulfamoyl group (e.g., sulfamoyl group, N,N-dimethylsulfamoyl group, morpholinosulfonyl group, piperidinosulfonyl group, etc.), an aryl group having up to 10 carbon atoms (e.g., phenyl group, 4-chlorophenyl group, 4-methylphenyl group, α-naphthyl group, etc.), a substituted or unsubstituted amino group (e.g., amino group, dimethylamino group, diethylamino group, dibutylamino group, anilino group, N-methylanilino group, naphthylamino group, etc.) and a heterocyclic group (e.g., pyrimidinyl group, indolyl group, tetraazaindenyl group, etc.). An alkyl group having up to 18 carbon atoms, which is substituted by one or more of the above-described substituent groups, is more preferred.

The alkyl group represented by R more preferably has 1 to 12 carbon atoms.

The aryl group represented by R includes a substituted aryl group. An unsubstituted or substituted aryl group having 6 to 18 carbon atoms is preferred. Preferred examples of the aryl group include phenyl group, carboxyphenyl group, tolyl group, chlorophenyl group, hydroxyphenyl group, naphthyl group, methoxyphenyl group, dimethoxyphenyl group, 3,4-methylenedioxyphenyl group and aminophenyl group.

The heterocyclic group represented by R is preferably a five-membered to seven-membered ring group, more preferred a five-membered or six-membered ring group. Preferred examples of substituted or unsubstituted five-membered to seven-membered heterocyclic groups include pyrrolo group, pyridyl group, quinolyl group, thiophenyl group, acridinyl group and 2,4-dihydroxypyrimidine-6-yl group. These rings may be further substituted by substituent groups described above in the definition of the substituent groups for $R_1$ and $R_2$.

$Q_1$ and $Q_2$ each represents an atomic group required, in combination with the two carbon atoms on the methine chain as shown in formula (I), for forming any one of the ring structures mentioned above.

m is preferably 1; j and k each is preferably 0, 1 or 2, and the sum of j+k is preferably not larger than 3, more preferably 0, 1 or 2.

The compounds of the present invention are characterized by that they are water-soluble. In addition to the field of photographic materials, the compounds of the present invention can be widely used in other fields. For example, the dyes can be used not only as water-soluble sensitizing dyes in the field of photographic materials, but also as dyes which can dye a mixture of groundwood pulp and bleached sulfite pulp as well as pure pulp and can be completely fixed.

Further, the compounds of the present invention are water-soluble and hence they can be applied as dyes for medical and biochemical inspection.

Examples of the compounds represented by general formula (I) according to the present invention include, but are not limited to, the following compounds.

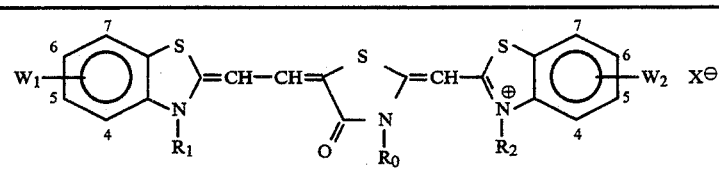

| Compound No. | $W_1$ | $R_1$ | $R_0$ | $R_2$ | $W_2$ | $X^⊖$ |
|---|---|---|---|---|---|---|
| 1 | H | $C_2H_5$ | $C_2H_5$ | $C_2H_5$ | H | $CH_3COO^⊖$ |
| 2 | 5-$CH_3$ | $C_2H_5$ | $C_2H_5$ | $C_2H_5$ | H | $CH_3COO^⊖$ |
| 3 | 5-Cl | $C_2H_5$ | $C_2H_5$ | $C_2H_5$ | H | $CH_3COO^⊖$ |
| 4 | 5-$CF_3$ | $C_2H_5$ | $C_2H_5$ | $C_2H_5$ | H | $CH_3COO^⊖$ |
| 5 | 5-$CH_3$ 5-$CH_3$ | $C_2H_5$ | $C_2H_5$ | $C_2H_5$ | H | $CH_3COO^⊖$ |
| 6 | *5-$OC_2H_5$ 6-$CH_3$ | $C_2H_5$ | $C_2H_5$ | $C_2H_5$ | H | HO—CH—COO$^⊖$ \| $CH_2COOH$ |
| 7 | H | $CH_3$ | $CH_3$ | $CH_3$ | H | $CH_3COO^⊖$ |
| 8 | H | $CH_3$ | $CH_3$ | ⌒⌒OH | H | $CH_3COO^⊖$ |

-continued

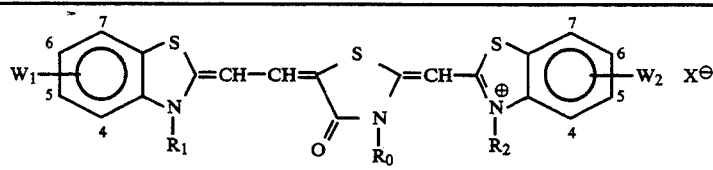

| Compound No. | W₁ | R₁ | R₀ | R₂ | W₂ | X⁻ |
|---|---|---|---|---|---|---|
| 9 | H | CH₃ | CH₃ | CH₃ | H | C₆H₅COO⁻ |
| 10 | H | CH₃ | CH₃ | CH₃ | H | CH₃—CH(OH)—COO⁻ |
| 11 | 5-OC₂H₅ 6-CH₃ | C₂H₅ | C₂H₅ | C₂H₅ | 6,7-benzo | CH₃COO⁻ |
| 12 | 5-CH₃ 6-CH₃ | C₂H₅ | C₂H₅ | C₂H₅ | 6,7-benzo | CH₃COO⁻ |
| 13 | 5-Cl | CH₃ | CH₃ | CH₃ | 6,7-benzo | CH₃COO⁻ |
| 14 | 5-CH₃ | CH₃ | CH₃ | CH₃ | 6,7-benzo | CH₃COO⁻ |
| 15 | 5-CF₃ | CH₃ | CH₃ | CH₃ | 6,7-benzo | CH₃COO⁻ |
| 16 | 6,7-benzo | C₂H₅ | C₂H₅ | C₂H₅ | 5-OC₂H₅ 6-CH₃ | CH₃COO⁻ |
| 17 | 6,7-benzo | CH₃ | CH₃ | CH₃ | 6,7-benzo | CH₃COO⁻ |
| 18 | 6,7-benzo | C₂H₅ | C₂H₅ | C₂H₅ | 6-CH₃ | CH₃COO⁻ |
| 19 | 4,5-benzo | CH₃ | CH₃ | CH₃ | 4,5-benzo | CH₃COO⁻ |
| 20 | 4,5-benzo | CH₃ | CH₃ | CH₃ | H | CH₃COO⁻ |
| 21 | 6,7-benzo | CH₃ | CH₃ | CH₃ | H | CH₃COO⁻ |
| 22 | 4,5-benzo | CH₃ | CH₃ | CH₃ | 5-OC₂H₅ 6-CH₃ | CH₃COO⁻ |
| 23 | 6,7-benzo | CH₃ | CH₃ | CH₃ | 4,5-benzo | CH₃COO⁻ |
| 24 | 4,5-benzo | CH₃ | CH₃ | CH₃ | 4,5-benzo | C₆H₅COO⁻ |

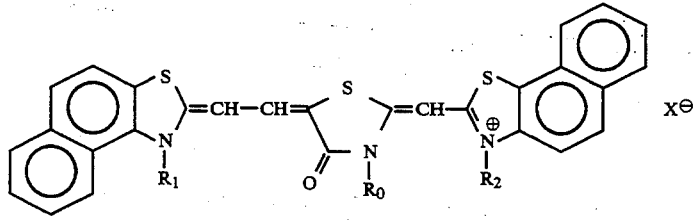

| Compound No. | R₁ | R₀ | R₂ | X⁻ |
|---|---|---|---|---|
| 25 | C₂H₅ | C₂H₅ | C₂H₅ | CH₃COO⁻ |
| 26 | C₂H₅ | C₂H₅ | CH₃ | CH₃COO⁻ |
| 27 | CH₃ | C₂H₅ | C₂H₅ | CH₃COO⁻ |
| 28 | C₂H₅ | C₂H₅ | CH₃ | C₂H₅COO⁻ |
| 29 | C₂H₅ | C₂H₅ | CH₃ | C₃H₇COO⁻ |
| 30 | C₂H₅ | C₂H₅ | CH₃ | C₄H₉COO⁻ |
| 31 | C₂H₅ | C₂H₅ | CH₃ | C₁₁H₂₃COO⁻ |
| 32 | C₂H₅ | C₂H₅ | CH₃ | C₆H₅COO⁻ |
| 33 | C₂H₅ | C₂H₅ | CH₃ | 2-OH-C₆H₄-COO⁻ |

-continued

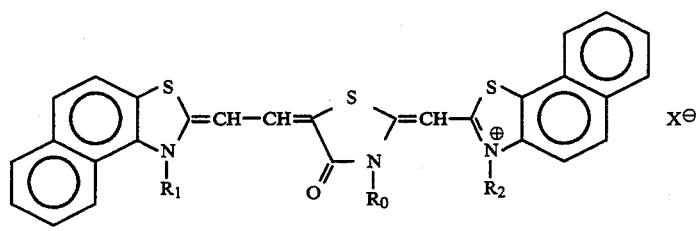

| Compound No. | $R_1$ | $R_0$ | $R_2$ | $X^\ominus$ |
|---|---|---|---|---|
| 34 | $C_2H_5$ | $C_2H_5$ | $CH_3$ | nicotinate (pyridine-3-COO⁻) |
| 35 | $C_2H_5$ | $C_2H_5$ | $CH_3$ | orotate |
| 36 | $C_2H_5$ | $C_2H_5$ | $CH_3$ | maleate (cis-HOOC–CH=CH–COO⁻) |
| 37 | $C_2H_5$ | $C_2H_5$ | $CH_3$ | fumarate (trans-HOOC–CH=CH–COO⁻) |
| 38 | $C_2H_5$ | $C_2H_5$ | $CH_3$ | $CH_3-CH(OH)-COO^\ominus$ |
| 39 | $C_2H_5$ | $C_2H_5$ | $CH_3$ | tartrate |
| 40 | $CH_3$ | $CH_3$ | $CH_3$ | $HOOC-CH_2CH_2-COO^\ominus$ |
| 41 | $CH_3$ | $CH_3$ | $CH_3$ | L-histidine |

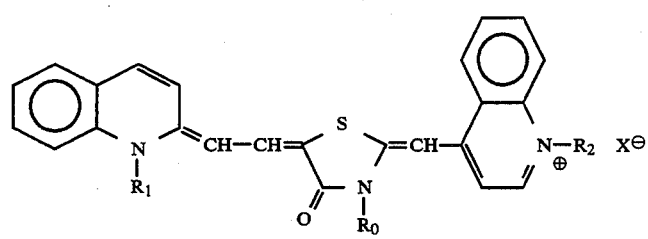

| Compound No. | $R_1$ | $R_0$ | $R_2$ | $X^\ominus$ |
|---|---|---|---|---|
| 42 | $C_2H_5$ | $CH_2CH=CH_2$ | $C_2H_5$ | $CH_3COO^\ominus$ |
| 43 | $C_2H_5$ | $C_2H_5$ | $CH_3$ | $CH_3COO^\ominus$ |

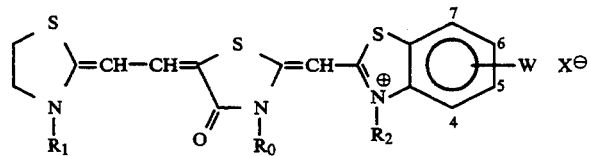

| Compound No. | $R_1$ | $R_0$ | $R_2$ | W | $X^\ominus$ |
|---|---|---|---|---|---|
| 44 | $CH_3$ | $CH_3$ | $CH_3$ | H | $CH_3COO^\ominus$ |
| 45 | $CH_3$ | $C_2H_5$ | $C_2H_5$ | 6,7-benzo | $CH_3COO^\ominus$ |
| 46 | $C_2H_5$ | $C_2H_5$ | ⌒⌒OH | H | $CH_3COO^\ominus$ |
| 47 | $C_2H_5$ | $C_2H_5$ | ⌒CH(OH)CH₂OH | 6,7-benzo | $CH_3COO^\ominus$ |
| 48 | $C_2H_5$ | $C_2H_5$ | $C_2H_5$ | 5-$OCH_3$, 6-$OCH_3$ | $H_3C$-C(COOH)=CH-$COO^\ominus$ |
| 49 | $C_2H_5$ | $C_2H_5$ | $C_2H_5$ | 5-$NHCOCH_3$ | $CH_3COO^\ominus$ |
| 50 | $C_2H_5$ | $C_2H_5$ | $C_2H_5$ | 6-OH | $CH_3COO^\ominus$ |
| 51 | $CH_3$ | $CH_3$ | ⌒⌒OH | 6,7-benzo | $CH_3COO^\ominus$ |
| 52 | $C_2H_5$ | $C_2H_5$ | $C_2H_5$ | 6,7-benzo | $CH_3COO^\ominus$ |

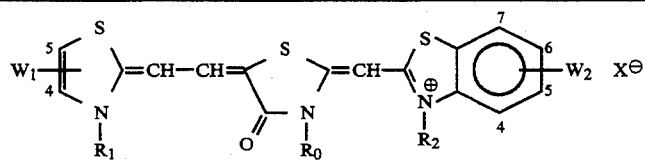

| Compound No. | $W_1$ | $R_1$ | $R_0$ | $R_2$ | $W_2$ | $X^\ominus$ |
|---|---|---|---|---|---|---|
| 53 | 4-$CH_3$ | $C_2H_5$ | $C_2H_5$ | $C_2H_5$ | H | $CH_3COO^\ominus$ |
| 54 | 4-$CH_3$ | $CH_3$ | $CH_3$ | $CH_3$ | H | $CH_3COO^\ominus$ |
| 55 | 4-$CH_3$ | $CH_3$ | $CH_3$ | $CH_3$ | 6,7-benzo | $CH_3COO^\ominus$ |
| 56 | 4-$CH_3$ | $CH_3$ | $CH_3$ | $CH_3$ | 4,5-benzo | $CH_3COO^\ominus$ |
| 57 | 4-$CH_3$ | $C_2H_5$ | $C_2H_5$ | $C_2H_5$ | 6,7-benzo | 4-HO-$C_6H_4$-$COO^\ominus$ |
| 58 | 4-$C_6H_5$ | $C_2H_5$ | $C_2H_5$ | $C_2H_5$ | H | $CH_3COO^\ominus$ |
| 59 | 4-$C_6H_5$ | $CH_3$ | $CH_3$ | $CH_3$ | 6,7-benzo | $CH_3COO^\ominus$ |
| 60 | 4-$C_6H_5$, 5-$C_6H_5$ | $CH_3$ | $CH_3$ | $CH_3$ | H | $CH_3$-CH(OH)-$COO^\ominus$ |
| 61 | 4-$C_6H_5$, 5-$C_6H_5$ | $CH_3$ | $CH_3$ | $CH_3$ | 6,7-benzo | $CH_3COO^\ominus$ |

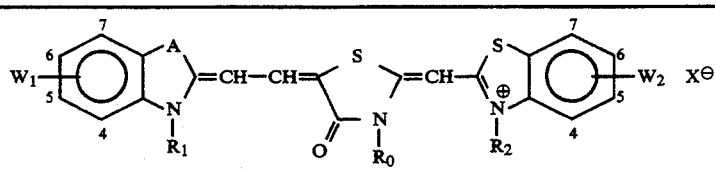

| Compound No. | $W_1$ | A | $R_1$ | $R_0$ | $R_2$ | $W_2$ | $X^\ominus$ |
|---|---|---|---|---|---|---|---|
| 62 | H | O | $C_2H_5$ | $C_2H_5$ | $C_2H_5$ | H | $CH_3COO^\ominus$ |

-continued

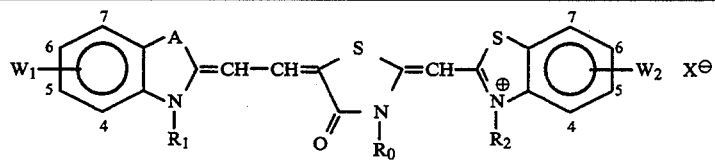

| Compound No. | $W_1$ | A | $R_1$ | $R_0$ | $R_2$ | $W_2$ | $X^\ominus$ |
|---|---|---|---|---|---|---|---|
| 63 | H | O | $CH_3$ | $CH_3$ | $CH_3$ | 6,7-benzo | $CH_3COO^\ominus$ |
| 64 | H | O | $C_2H_5$ | $C_2H_5$ | $CH_3$ | 4,5-benzo | $CH_3COO^\ominus$ |
| 65 | 5-$C_6H_5$ | O | $CH_3$ | $CH_3$ | $CH_3$ | H | $CH_3COO^\ominus$ |
| 66 | 5-$C_6H_5$ | O | $C_2H_5$ | $C_2H_5$ | $C_2H_5$ | 6,7-benzo | $CH_3COO^\ominus$ |
| 67 | 6,7-benzo | O | $C_2H_5$ | $C_2H_5$ | $C_2H_5$ | H | $CH_3COO^\ominus$ |
| 68 | 4,5-benzo | O | $C_2H_5$ | $C_2H_5$ | $C_2H_5$ | H | $CH_3COO^\ominus$ |
| 69 | 5,6-benzo | O | $C_2H_5$ | $C_2H_5$ | $C_2H_5$ | H | $CH_3COO^\ominus$ |
| 70 | 5,6-benzo | O | $C_2H_5$ | $C_2H_5$ | $C_2H_5$ | 5-Cl | $CH_3COO^\ominus$ |
| 71 | 5,6-benzo | O | $C_2H_5$ | $C_2H_5$ | $C_2H_5$ | 5-OH | $CH_3COO^\ominus$ |
| 72 | 5,6-benzo | O | $C_2H_5$ | $C_2H_5$ | $C_2H_5$ | 6,7-benzo | $CH_3COO^\ominus$ |
| 73 | H | Se | $C_2H_5$ | $C_2H_5$ | $C_2H_5$ | H | $CH_3COO^\ominus$ |
| 74 | H | Se | $CH_3$ | $CH_3$ | $CH_3$ | 6,7-benzo | $CH_3COO^\ominus$ |
| 75 | H | $\begin{array}{c}C_2H_5\\|\\N\end{array}$ | $C_2H_5$ | $C_2H_5$ | $C_2H_5$ | H | $CH_3COO^\ominus$ |
| 76 | H | $\begin{array}{c}C_2H_5\\|\\N\end{array}$ | $C_2H_5$ | $C_2H_5$ | $C_2H_5$ | 6,7-benzo | $CH_3COO^\ominus$ |
| 77 | H | $\begin{array}{c}CH_3\ CH_3\\ \diagdown\diagup\\ C\end{array}$ | $C_2H_5$ | $C_2H_5$ | $C_2H_5$ | H | $CH_3COO^\ominus$ |
| 78 | H | $\begin{array}{c}CH_3\ CH_3\\ \diagdown\diagup\\ C\end{array}$ | $C_2H_5$ | $C_2H_5$ | $C_2H_5$ | 4,5-benzo | $CH_3COO^\ominus$ |

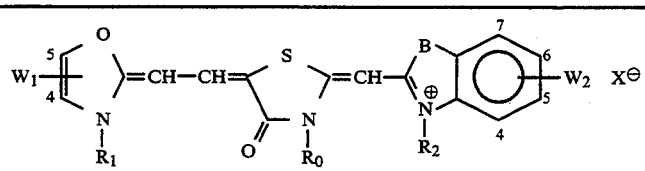

| Compound No. | $W_1$ | $R_1$ | $R_0$ | $R_2$ | B | $W_2$ | $X^\ominus$ |
|---|---|---|---|---|---|---|---|
| 79 | 4-$CH_3$ | $C_2H_5$ | $C_2H_5$ | $C_2H_5$ | S | H | $CH_3COO^\ominus$ |
| 80 | 4-$CH_3$ | $CH_3$ | $CH_3$ | $CH_3$ | S | 5-$OCH_3$<br>6-$OCH_3$ | $\begin{array}{c}\diagup COO^\ominus\\ \diagdown COOH\end{array}$ |

| Compound No. | $W_1$ | A | $R_1$ | $R_0$ | $R_2$ | B | $W_2$ | $X^\ominus$ |
|---|---|---|---|---|---|---|---|---|
| 81 | H | S | $CH_2$ | $CH_3$ | $CH_3$ | O | H | $CH_3COO^\ominus$ |
| 82 | 4,5-benzo | S | $CH_3$ | $CH_3$ | $CH_3$ | O | H | $CH_3COO^\ominus$ |
| 83 | 6,7-benzo | S | $CH_3$ | $CH_3$ | $CH_3$ | O | H | $CH_3COO^\ominus$ |
| 84 | H | S | $CH_3$ | $C_2H_5$ | $CH_3$ | $\begin{array}{c}CH_3\ CH_3\\ \diagdown\diagup\\ C\end{array}$ | H | $CH_3COO^\ominus$ |
| 85 | 6,7-benzo | S | $CH_3$ | $CH_3$ | $CH_3$ | $\begin{array}{c}CH_3\ CH_3\\ \diagdown\diagup\\ C\end{array}$ | H | $CH_3COO^\ominus$ |

-continued

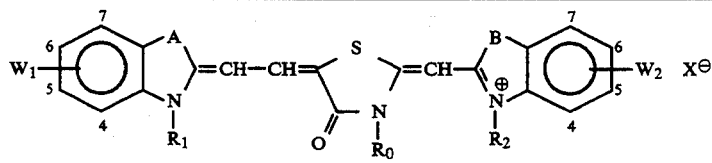

| Compound No. | $W_1$ | A | $R_1$ | $R_0$ | $R_2$ | B | $W_2$ | $X^\ominus$ |
|---|---|---|---|---|---|---|---|---|
| 86 | 6,7-benzo | S | $C_2H_5$ | $C_2H_5$ | $C_2H_5$ | O | 6,7-benzo | $CH_3COO^\ominus$ |

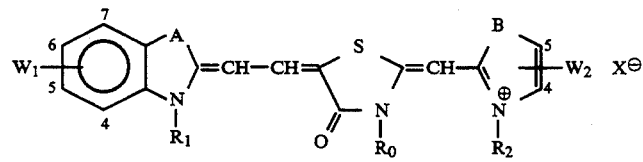

| Compound No. | $W_1$ | A | $R_1$ | $R_0$ | $R_2$ | B | $W_2$ | $X^\ominus$ |
|---|---|---|---|---|---|---|---|---|
| 87 | 4,5-benzo | S | $CH_3$ | $CH_3$ | $CH_3$ | S | $4\text{-}CH_3$ | $CH_3COO^\ominus$ |
| 88 | H | O | $C_2H_5$ | $C_2H_5$ | $C_2H_5$ | S | $4\text{-}C_4H_5$ $5\text{-}C_4H_5$ | $CH_3COO^\ominus$ |
| 89 | 4,5-benzo | S | $C_2H_5$ | $C_2H_5$ | $C_2H_5$ | S | $4\text{-}C_4H_5$ $5\text{-}C_4H_5$ | $CH_3COO^\ominus$ |
| 90 | 5,6-benzo | O | $CH_3$ | $CH_3$ | $CH_3$ | S | $4\text{-}C_4H_5$ $5\text{-}C_4H_5$ | $CH_3COO^\ominus$ |
| 91 | H | $\mathrm{CH_3}\,\mathrm{CH_3}$ \\ C | $CH_3$ | $C_2H_5$ | $C_2H_5$ | S | $4\text{-}C_4H_5$ $5\text{-}C_4H_5$ | $\begin{array}{c}COO^\ominus\\ \\ COOH\end{array}$ |

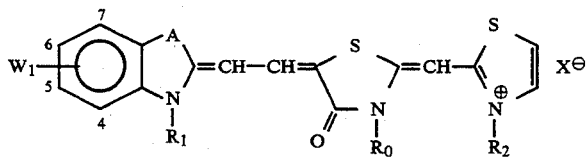

| Compound No. | W | A | $R_1$ | $R_0$ | $R_2$ | $X^\ominus$ |
|---|---|---|---|---|---|---|
| 92 | 4,5-benzo | S | $CH_3$ | $CH_3$ | $CH_3$ | $CH_3COO^\ominus$ |
| 93 | 6,7-benzo | S | $C_2H_5$ | $C_2H_5$ | $C_2H_5$ | $CH_3COO^\ominus$ |
| 94 | H | $\mathrm{H_3C}\,\mathrm{CH_3}$ \\ C | $CH_3$ | $CH_3$ | $CH_3$ | $CH_3COO^\ominus$ |

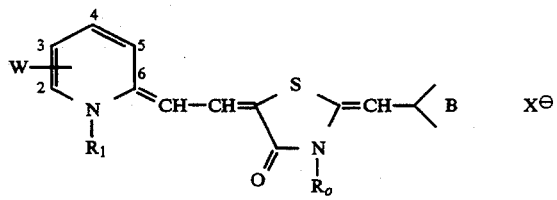

| Compound No. | W | $R_1$ | $R_0$ | B | $X^\ominus$ |
|---|---|---|---|---|---|
| 95 | H | $CH_3$ | $CH_3$ | 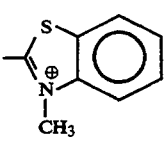 | $CH_3COO^\ominus$ |

-continued

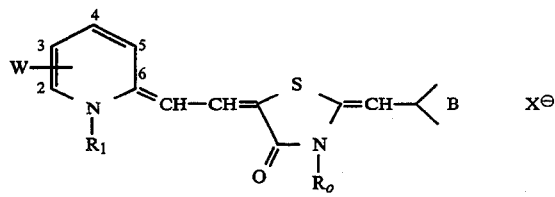

| Compound No. | W | $R_1$ | $R_0$ | B | $X^{\ominus}$ |
|---|---|---|---|---|---|
| 96 | 2,3-benzo | $C_2H_5$ | $C_3H_7$ | 2-methyl-3-ethylbenzothiazolium | $CH_3COO^{\ominus}$ |
| 97 | 2,3-benzo | $C_2H_5$ | $C_2H_5$ | 2-methyl-3-ethylbenzothiazolium | $CH_3COO^{\ominus}$ |

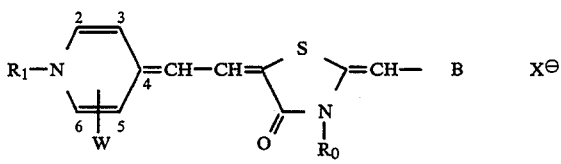

| Compound No. | W | $R_1$ | $R_0$ | B | $X^{\ominus}$ |
|---|---|---|---|---|---|
| 98 | H | $CH_3$ | $CH_3$ | 2-methyl-3-ethylbenzothiazolium | $CH_3COO^{\ominus}$ |
| 99 | H | $C_2H_5$ | $C_2H_5$ | 2-methyl-3-methylnaphtho[2,1-d]thiazolium | $CH_3COO^{\ominus}$ |
| 100 | 2,3-benzo | $CH_2CH=CH_2$ | $CH_2CH=CH_2$ | 2-methyl-3-ethylnaphtho[2,1-d]thiazolium | $CH_3COO^{\ominus}$ |
| 101 | 2,3-benzo | $C_2H_5$ | $C_3H_7$ | 2,5,6-trimethyl-3-ethylbenzoxazolium | $CH_3COO^{\ominus}$ |

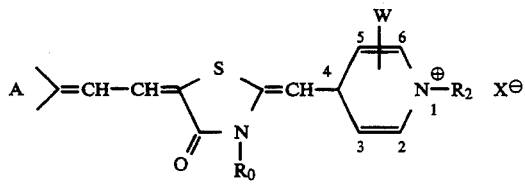

| Compound No. | A | R₀ | R₂ | W | X⊖ |
|---|---|---|---|---|---|
| 102 | (1-methyl-quinoline-4-ylidene) | CH₃ | CH₃ | 2,3-benzo | CH₃COO⊖ |
| 103 | (3-ethyl-benzothiazol-2-ylidene) | C₂H₅ | C₂H₅ | 2,3-benzo | CH₃COO⊖ |
| 104 | (1,3-diethyl-benzimidazol-2-ylidene) | CH₃ | CH₃ | 2,3-benzo | C₂H₅COO⊖ |

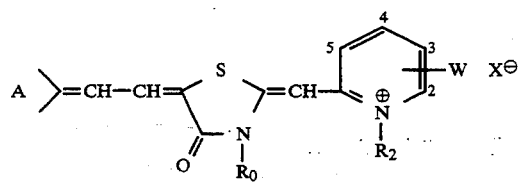

| Compound No. | A | R₀ | R₂ | W | X⊖ |
|---|---|---|---|---|---|
| 105 | (1-ethyl-quinolin-2-ylidene) | CH₃ | C₂H₅ | 2,3-benzo | CH₃COO⊖ |
| 106 | (1-ethyl-3,3-dimethyl-indol-2-ylidene) | C₂H₅ | C₂H₅ | 2,3-benzo | maleate (COO⊖/COOH) |
| 107 | (3-methyl-naphth[2,3-d]oxazol-2-ylidene) | CH₃ | CH₃ | 2,3-benzo | maleate (COO⊖/COOH) |

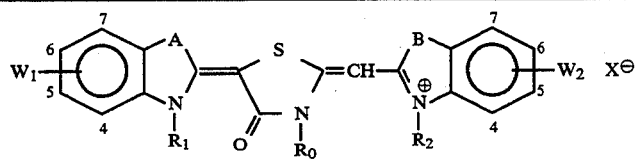

| Compound No. | $W_1$ | A | $R_1$ | $R_0$ | $R_2$ | B | $W_2$ | $X^\ominus$ |
|---|---|---|---|---|---|---|---|---|
| 108 | H | S | $CH_3$ | $CH_3$ | $CH_3$ | S | H | $CH_3COO^\ominus$ |
| 109 | H | S | $CH_3$ | $C_2H_5$ | $C_2H_5$ | S | H | $C_2H_5COO^\ominus$ |
| 110 | H | S | $CH_3$ | $C_2H_5$ | $C_2H_5$ | S | 5-$CH_3$ 6-$CH_3$ | $CH_3COO^\ominus$ |
| 111 | 5-$OCH_3$ | S | $CH_3$ | $C_2H_5$ | $C_2H_5$ | S | 5-$CH_3$ 6-$CH_3$ | $CH_3COO^\ominus$ |
| 112 | 5-$OCH_3$ 6-$OCH_3$ | S | $CH_3$ | $CH_3$ | $CH_3$ | S | H | $CH_3COO^\ominus$ |
| 113 | 5-$OCH_3$ | S | $CH_3$ | $C_2H_5$ | $C_2H_5$ | S | H | $CH_3COO^\ominus$ |
| 114 | 5-Cl | S | $CH_3$ | $C_2H_5$ | $C_2H_5$ | S | H | $CH_3COO^\ominus$ |
| 115 | 5-$CH_3$ | S | $CH_3$ | $C_2H_5$ | $C_2H_5$ | S | H | $CH_3COO^\ominus$ |
| 116 | 5-$CF_3$ | S | $CH_3$ | $CH_3$ | $CH_3$ | S | H | $CH_3COO^\ominus$ |
| 117 | H | S | $CH_3$ | $CH_3$ | $CH_3$ | S | 6,7-benzo | $CH_3COO^\ominus$ |
| 118 | H | S | $CH_3$ | $CH_3$ | $CH_3$ | S | 4,5-benzo | $CH_3COO^\ominus$ |
| 119 | 5-OH | S | $CH_3$ | $C_2H_5$ | $C_2H_5$ | S | H | $CH_3COO^\ominus$ |
| 120 | H | S | $CH_3$ | $C_2H_5$ | $C_2H_5$ | Se | H | $CH_3COO^\ominus$ |
| 121 | 6,7-benzo | S | $CH_3$ | $C_2H_5$ | $C_2H_5$ | S | H | $CH_3COO^\ominus$ |
| 122 | H | O | $CH_3$ | $C_2H_5$ | $C_2H_5$ | S | H | $CH_3COO^\ominus$ |
| 123 | 5-$C_6H_5$ | O | $CH_3$ | $C_2H_5$ | $C_2H_5$ | S | H | $CH_3COO^\ominus$ |
| 124 | 5-Cl | O | $CH_3$ | $CH_3$ | $CH_3$ | S | H | $CH_3COO^\ominus$ |
| 125 | 5-$OCH_3$ | O | $CH_3$ | $CH_3$ | $CH_3$ | S | H | $CH_3COO^\ominus$ |
| 126 | 6,7-benzo | O | $CH_3$ | $CH_3$ | $CH_3$ | S | H | $CH_3COO^\ominus$ |
| 127 | 4,5-benzo | O | $CH_3$ | $C_2H_5$ | $CH_3$ | S | H | $CH_3COO^\ominus$ |
| 128 | H | S | $CH_3$ | $C_2H_5$ | $C_2H_5$ | O | H | $CH_3COO^\ominus$ |
| 129 | H | S | $CH_3$ | $CH_3$ | $C_2H_5$ | O | H | $CH_3COO^\ominus$ |
| 130 | H | S | $CH_3$ | $CH_3$ | $CH_2CH_2OCH_3$ | O | H | $CH_3COO^\ominus$ |
| 131 | H | S | $CH_3$ | $C_2H_5$ | $C_2H_5$ | O | 5-Cl | $CH_3COO^\ominus$ |
| 132 | H | S | $CH_3$ | $C_2H_5$ | $C_2H_5$ | O | 5-$CH_3$ 6-$CH_3$ | $CH_3COO^\ominus$ |
| 133 | H | S | $CH_3$ | $C_2H_5$ | $C_2H_5$ | O | 5-$C_6H_5$ | $CH_3COO^\ominus$ |
| 134 | H | S | $CH_3$ | $C_2H_5$ | $C_2H_5$ | O | 6,7-benzo | $CH_3COO^\ominus$ |
| 135 | H | S | $CH_3$ | $C_2H_5$ | $C_2H_5$ | O | 4,5-benzo | $CH_3COO^\ominus$ |
| 136 | 5-$OCH_3$ | S | $CH_3$ | $C_2H_5$ | $C_2H_5$ | O | H | $CH_3COO^\ominus$ |

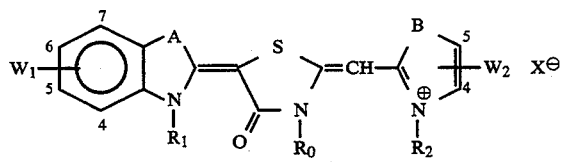

| Compound No. | $W_1$ | A | $R_1$ | $R_0$ | $R_2$ | B | $W_2$ | $X^\ominus$ |
|---|---|---|---|---|---|---|---|---|
| 137 | H | S | $CH_3$ | $C_2H_5$ | $C_2H_5$ | S | 4-$CH_3$ | $CH_3COO^\ominus$ |
| 138 | H | S | $CH_3$ | $CH_3$ | $CH_3$ | S | 4-$C_6H_5$ 5-$C_6H_5$ | $CH_3COO^\ominus$ |

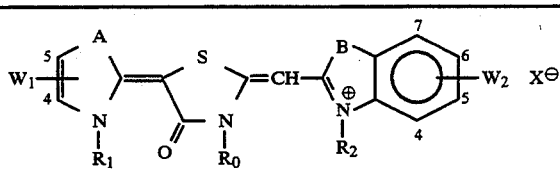

| Compound No. | $W_1$ | A | $R_1$ | $R_0$ | $R_2$ | B | $W_2$ | $X^\ominus$ |
|---|---|---|---|---|---|---|---|---|
| 139 | 4-$CH_3$ | S | $CH_3$ | $C_2H_5$ | $C_2H_5$ | S | H | $CH_3COO^\ominus$ |

| 140 | (cyclohexyl, positions 4,5) | S | CH₃ | C₂H₅ | CH₃ | S | H | CH₃COO⁻ |
| 141 | [structure] | | | | | | | CH₃COO⁻ |
| 142 | [structure] | | | | | | | CH₃COO⁻ |
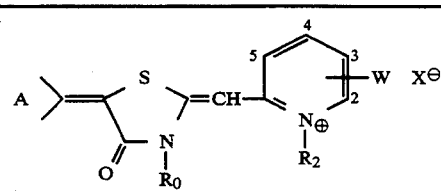
| Compound No. | A | R₀ | R₂ | W | X⁻ |
|---|---|---|---|---|---|
| 143 | [benzothiazole-N-CH₃] | C₂H₅ | C₂H₅ | H | C₆H₅COO⁻ |
| 144 | [benzothiazole-N-CH₃] | CH₃ | CH₃ | 2,3-benzo | CH₃COO⁻ |
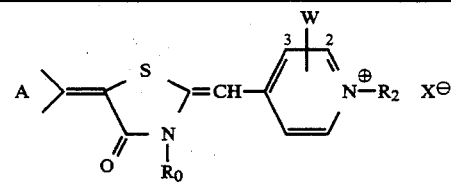
| Compound No. | A | R₀ | R₂ | W | X⁻ |
|---|---|---|---|---|---|
| 145 | [benzothiazole-N-CH₃] | CH₃ | CH₃ | H | C₆H₅COO⁻ |
| 146 | [benzothiazole-N-CH₃] | CH₃ | CH₃ | 2,3-benzo | CH₃COO⁻ |

-continued
147 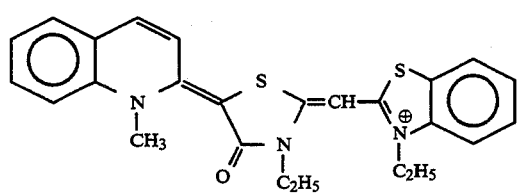 C2H5COO⁻
148 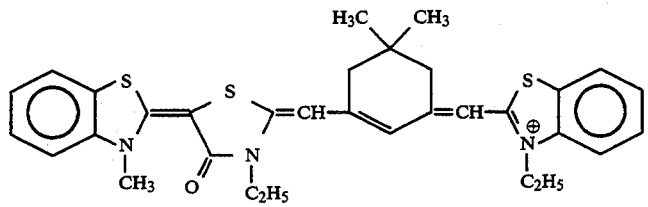 ⁻OCCH3
‖
O
149 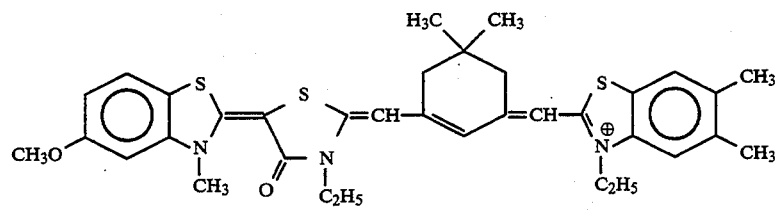 ⁻OCCH3
‖
O
150 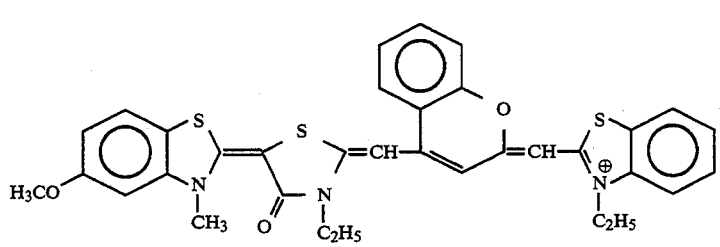 ⁻OCCH3
‖
O
151 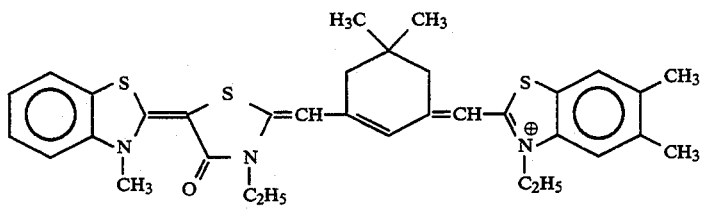 ⁻OCCH3
‖
O
152 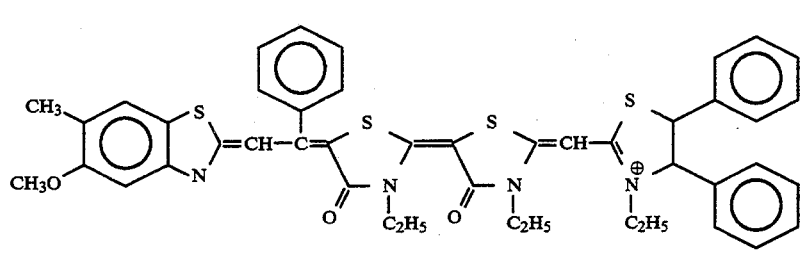 CH3COO⁻
153 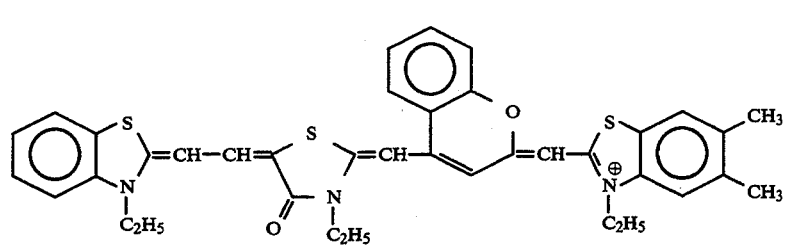 CH3COO⁻

154 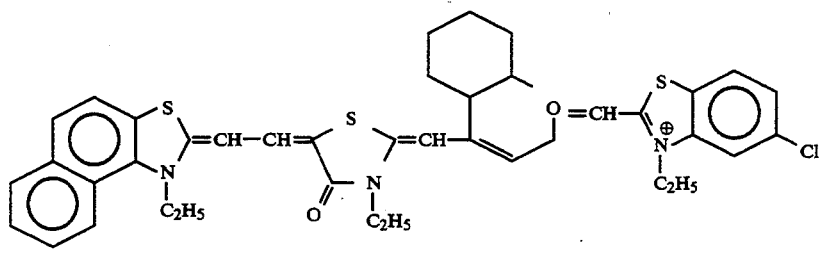 CH₃COO⊖
155 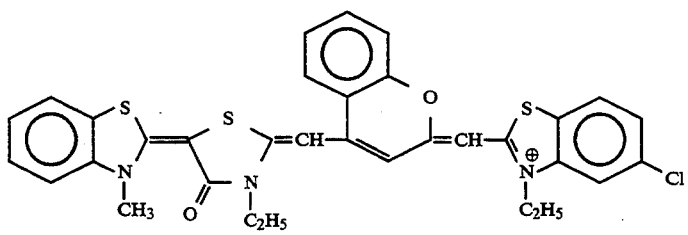 CH₃COO⊖
156 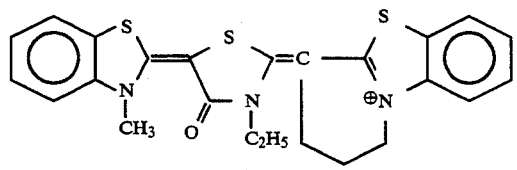 CH₃COO⊖
157 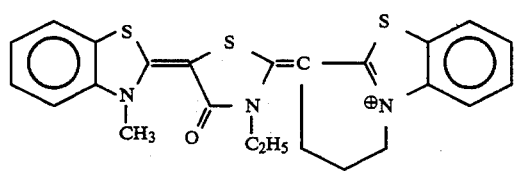 CH₃COO⊖
158 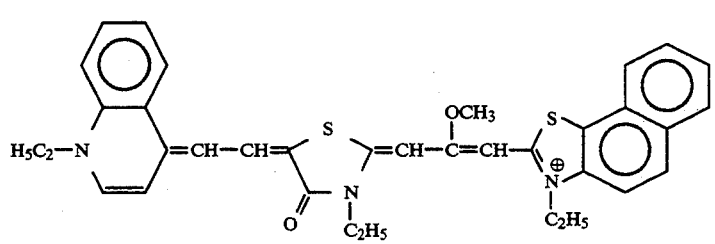 CH₃COO⊖
159 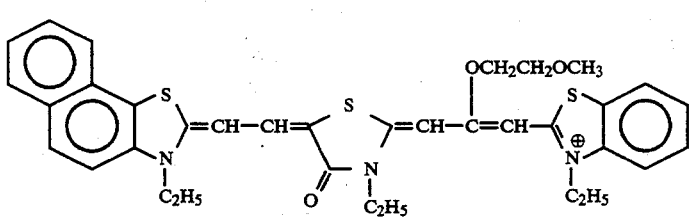 CH₃COO⊖
160 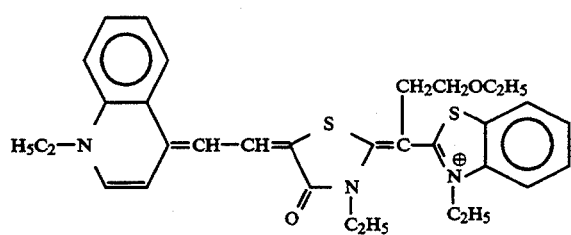 CH₃COO⊖

161 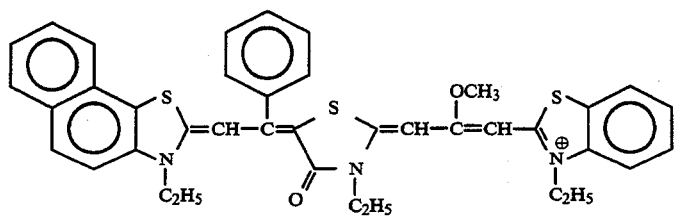 CH₃COO⁻

162 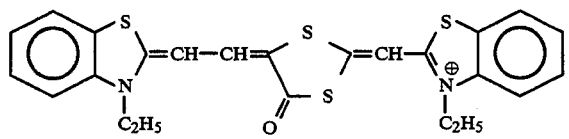 CH₃COO⁻

163 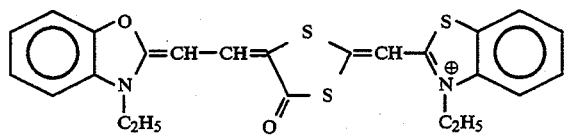 CH₃COO⁻

164 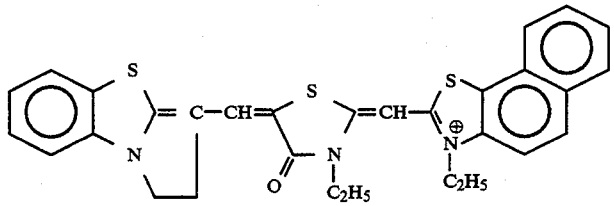 CH₃COO⁻

165 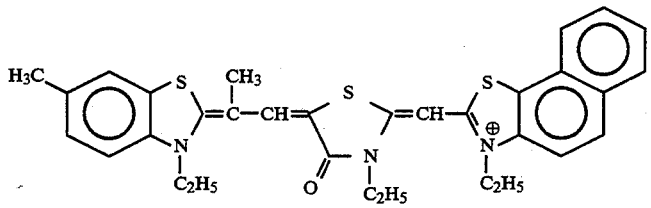 CH₃COO⁻

166 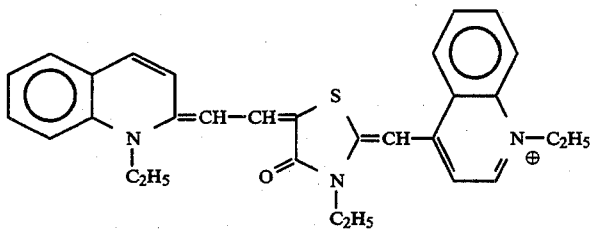 CH₃COO⁻

Further aspects of the compounds of the present invention will be illustrated in detail below.

The dye moiety (a moiety containing no counter anion R—COO[63]) of each of the sensitizing dyes represented by general formula (I) according to the present invention can be synthesized using the synthesis methods described in F. M. Hamer, *The Chemistry of Heterocyclic Compounds*, Vol. 18 (1964), Chapter 15; F. M. Hamer, *Heterocyclic Compounds—Cyanine Dyes and Related Compounds*, Chapters 4, 5 and 6, pp. 86–119 (John Wiley and Sons, 1964); and D. M. Sturmer, *Heterocyclic Compounds—Special Topics in Heterocyclic Chemistry*, Chapter 8, pp. 482–515 (John Wiley and Sons, 1977).

Many counter anions are known when the dye moiety is synthesized by the above-described literature.

The counter anion may be any of an inorganic anion and an organic anion. Examples of the anion include halogen anion (e.g., fluorine ion, chlorine ion, bromine ion, iodine ion), substituted arylsulfonate ions (e.g., p-toluenesulfonate ion, p-chlorobenzenesulfonate ion), aryldisulfonate ions (e.g., 1,3-benzenedisulfonate ion, 1,5-naphthalenedisulfonate ion, 2,6-naphthalenedisulfonate ion), alkylsulfate ions (e.g., methylsulfate ion), sulfate ion, thiocyanate ion, perchlorate ion, tetrafluoroborate ion, picrate ion and trifluoromethanesulfonate ion.

Accordingly, the synthesis of the compounds of the present invention is illustrated below by using sensitizing dyes composed of these known dye moieties and counter anion moieties.

Namely, the compounds of the present invention can be synthesized by introducing to such known dye moieties an organic carboxylate anion as a counter anion by ion exchange.

Methods for exchanging a counter ion with an organic carboxylate anion are illustrated below.

The following four methods may be used to obtain the compounds of the present invention.

(1) Method using silver salt of an organic carboxylic acid and a dye halide:

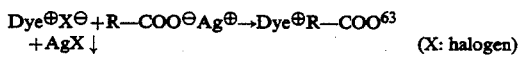
(X: halogen)

As shown by the above scheme, a spectral sensitizing dye (Dye$^\oplus$) having a halogen anion (I$^\ominus$, Br$^\ominus$, Cl$^\ominus$) is used as a starting material and dissolved in a solvent, e.g., methanol, ethanol or chloroform. At least an equimolar amount of silver salt of an organic carboxylic acid is added to the resulting solution, and the mixture is stirred in a dark place at room temperature.

After the mixture is stirred for a given period of time (the time varies depending on compounds and solvents, but is generally several minutes to several hours), the formed silver halide is recovered by filtration through a diatom earth, such as Celite 545, a commercially available diatom earth sold by Manville Sales Corp. The silver salt of the organic carboxylic acid is again added to the filtrate. Stirring and filtration are repeatedly carried out to allow exchange to proceed completely. A dye having been completely exchanged with the organic carboxylate anion can be obtained by generally three or less exchange operations.

The final filtrate is left to stand in a dark place at room temperature for several hours. The filtrate is then filtered through Celite or a short silica gel column, and the solvent is distilled off under reduced pressure.

The residue is recrystallized or re-precipitated from an appropriate solvent to isolate the desired compound.

Certain compounds may be somewhat decomposed during the anion exchange reaction. In this case, it is necessary that the compounds are purified by means of recrystallization or silica gel column chromatography.

The operation must be carefully conducted, because the organic carboxylate-anionized dye is apt to be decomposed when the anionized dye is left to stand in the presence of water for a long period of time, or heat is applied to the dye.

Many silver salts of organic carboxylic acids which can be used for the above method are commercially available. Silver salts which are not commercially available are described in the literature and can be easily prepared. Examples of suitable literature include U.S. Pat. Nos. 3,457,075, 3,549,379, 3,785,830, 3,933,507 and 4,009,039, U.K. Patent 1,230,642, JP-A-50-93139, JP-A-50-99719, JP-A-51-22431, JP-A-52-141222 and JP-A-53-36224.

(2) Method using alkali metal salts of organic carboxylic acids:

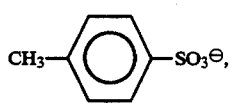

An alkali metal salt of an organic carboxylic acid to be substituted is mixed with silica gel. A column for conventional chromatography is packed with the mixture.

The column is then charged with a dye having another counter ion, and development is slowly conducted with a solvent (usually chloroform/methanol, etc.). Exchange varies depending-on the types and amounts of compounds and solvents, but exchange is completed by one or two development operations when development is conducted over a period of several hours by using a large excess of an alkali metal salt of an organic carboxylic acid. Exchange can be made more efficiently when a developer containing the alkali metal salt of the organic carboxylic acid dissolved therein is used.

The solvents in the resulting dye solution eluted are distilled off under reduced pressure. Chloroform and optionally methanol are added to the residue to dissolve it. The solution is filtered.

The filtrate is dried and passed through a Sephadex column (Sephadex ® LH-20, a product of Pharmacia LKB, Biotechnology AB, Uppsala, Sweden) to completely separate the alkali metal salt of the organic carboxylic acid remained unreacted. The resulting dye having the organic carboxylate anion is purified by means of recrystallization or re-precipitation.

(3) Method using barium salt of an organic carboxylic acid and sulfate ion of a dye:

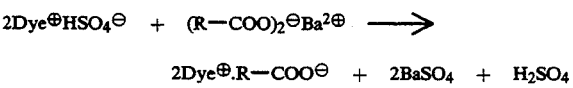

The dye sulfate is dissolved in a solvent such as methanol. An equimolar amount or more of barium salt of an organic carboxylic acid is added to the resulting solution. The mixture is vigorously stirred at room temperature.

The formed barium sulfate is recovered by filtration. Barium salt of the organic carboxylic acid is again added to the filtrate. The mixture is vigorously stirred. The solution is filtered through Celite or silica gel short column. The solvent in the filtrate is distilled off under reduced pressure. The residue is recrystallized or re-precipitated by using an appropriate solvent to isolate the desired compound.

(4) Method using an ion-exchange resin:

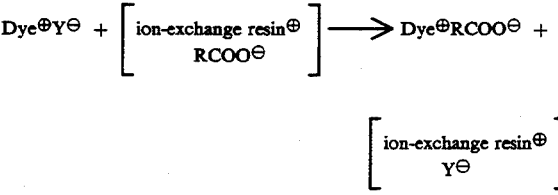

Anion-exchange resin is previously treated with an organic carboxylic acid to form an organic carboxylate of ion-exchange resin. A column for conventional chromatography is packed with the pre-treated ion-exchange resin.

A solution of dye (for example, a halide, a sulfonate and a sulfate) in a solvent (for example, methanol, and a mixture of methanol and chloroform) is passed through the column to change the counter anion of the dye to an organic carboxylate anion. Alternatively, the dye solution and the organic carboxylate of ion-exchange resin are mixed and stirred, and then the ion-exchange resin is filtered off. The thus obtained dye solution is concentrated under reduced pressure and the desired dye is recovered from the residue with using an appropriate solvent.

An exchange with the desired organic carboxylate can be made by the above-described methods (1) to (4). The method to be chosen varies depending on the structures of the dyes to be used as the starting materials, the types of the counter ions, solubility, stability, etc., but the method (1) is generally preferable in most cases.

A confirmation of the exchange with the organic carboxylate was made to see whether any counter anion in the starting material existed and whether the desired organic carboxylate anion existed, by using mainly mass spectrum (FAB-MS, nega) (when the counter anion in the starting material was a -halogen ion, Beilstein test (flame reaction) was used together with mass spectrum).

Further, a confirmation of a relative amount ratio of the organic carboxylate anion to the dye was made by $^1$H-NMR.

Furthermore, absolute purity was measured by elemental analysis and a comparison between the molecular extinction coefficients in visible absorption of the dye before and after exchange.

The present invention is now illustrated in greater detail by reference to the following examples which, however, are not to be construed as limiting the invention in any way.

First, specific methods for synthesizing the compounds of the present invention, employing the general principles of methods (1) to (4) described above, are illustrated below.

EXAMPLE 1

Synthesis of Compound 53 (Method (1))

2 g of compound A* was dissolved in 1 liter of a 1:1 mixed solvent of chloroform-methanol, and the solution was once filtered. 2.5 g (4.37 equivalents) of silver acetate powder was added to the filtrate. The reactor was shielded from light, and the mixture was stirred at room temperature for 2 hours. The reaction mixture was filtered under reduced pressure to remove silver iodide formed. Further, 1.5 g (2.62 equivalents) of silver acetate was added to the filtrate, and the mixture was stirred at room temperature under light-shielding conditions for one hour and filtered through Celite.

The solvent in the filtrate was distilled off at 40° C. or lower under reduced pressure. When the amount of the solvent was reduced to about ⅓, the filtrate was left to stand at room temperature for one hour and then filtered through Celite. The solvent in the filtrate was distilled off at 40° C. or lower under reduced pressure. The residue was dissolved in 30 ml of methanol, and 300 ml of ether was added dropwise thereto. The precipitated crystal was recovered by filtration, washed with ethyl acetate and dried to obtain 1.70 g (yield: 96%) of a brown powder having melting point of 169°–174° C. * Compound A

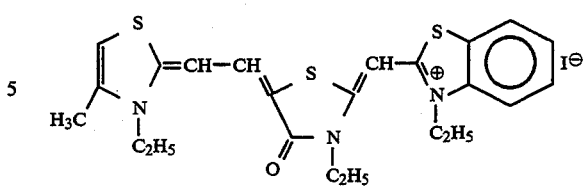

EXAMPLE 2

Synthesis of Compound 53 (Method (2))

30 g of sodium acetate was added to 300 g of silica gel (for flash column, 230–400 mesh, a product of Merck), and the mixture was thoroughly mixed until the mixture became uniform. A glass column was previously packed with 200 g of the same silica gel by using a (5:1) mixed solvent of chloroform-methanol and then packed with silica gel containing sodium acetate prepared above. Further, 10 g of sodium acetate was placed thereon, and moreover sea sand was placed thereon to prepare a column.

One gram of compound B* was dissolved in a (10:1) mixed solvent of chloroform-methanol. The solution was charged into the column, and the dye solution was eluted with a chloroform-methanol (5:1~4:1) developer over a period of about 4 hours.

The solvent in the dye solution was distilled off at 40° C. or lower under reduced pressure. The residue was dissolved in chloroform with stirring, and the solution was filtered. The filtrate was concentrated at 40° C. or lower, charged into a Sephadex column (Sephadex ® LH-20, a product of Farmasia LKB, Biotechnology AB, Uppsale, Sweden) (chloroform-methanol (1:1)) and developed with a (1:1) mixed solvent of chloroform-methanol to obtain dye solution. The solvent in the dye solution was distilled off at 40° C. or lower under reduced pressure. The residue was dissolved in 20 ml of methanol, and 200 ml of ether was added dropwise thereto. The precipitated crystal was recovered by filtration and dried to obtain 0.45 g (yield: 55%) of a brown powder having a melting point of 165°–173° C. * Compound B

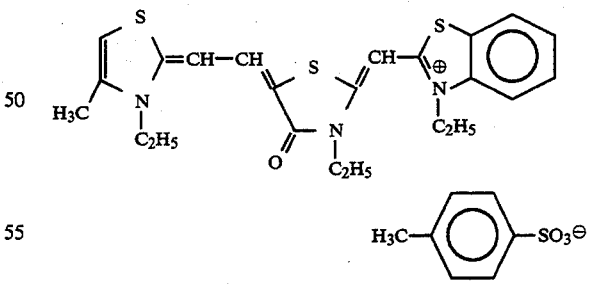

EXAMPLE 3

Synthesis of Compound 53 (Method (3))

2 g of compound C* was dissolved in 1 liter of a (1:3) mixed solvent of chloroform and methanol, and the solution was once filtered. 2 g (2.2 equivalents) of barium acetate powder was added to the filtrate at room temperature. The mixture was vigorously stirred with a mechanical stirrer at room temperature for 2 hours. The reaction mixture was filtered. One gram of barium acetate was added to the filtrate. The mixture was stirred at room temperature for one hour and the solvent was distilled off at 40° C. or lower under reduced pressure. The residue was concentrated to about ⅓ volume and then left to stand at room temperature for one hour.

The resulting solution was filtered through Celite, and the solvent in the filtrate was distilled off under reduced pressure. The residue was dissolved in chloroform. The solution was passed through a short column packed with 50 g of silica gel and concentrated to dryness. The residue was dissolved in 20 ml of methanol, and 200 ml of ether was added dropwise thereto. The precipitated crystal was recovered by filtration to obtain 1.5 g (yield: 81%) of a brown powder having a melting point of 164°–172° C. * Compound C

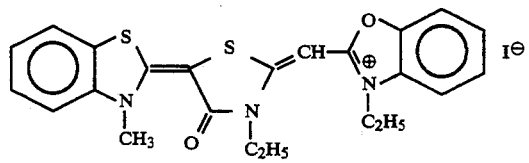

EXAMPLE 5

Synthesis of Compound 25 (Method (!))

2 g of compound E* was dissolved in 3 l of a (1:2) mixed solvent of chloroform-methanol with heating, and the solution was filtered. 4 g of silver acetate was added to the filtrate, and the mixture was stirred at room temperature under light-shielding conditions for 5 hours. The reaction mixture was filtered through Celite. The solvent in the filtrate was concentrated at 50° C. or below under reduced pressure to about 500 ml. The filtrate was then left to stand at room temperature for one hour and again filtered through Celite. The filtrate was concentrated to dryness at 40° C. or below. The residue was dissolved in 50 ml of methanol, and 300 ml of ethyl acetate was added thereto to precipitate a crystal. The crystal was recovered by filtration, washed with ether and ethyl acetate and dried to obtain 1.8 g (yield: 99%) of a brown powder having a melting point of 185°–190° C. *Compound E

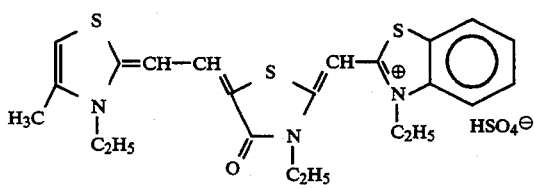

EXAMPLE 4

Synthesis of Compound 128 (Method (1))

2.0 g of compound D* was dissolved in 800 ml of methanol and 200 ml of chloroform with heating, and the solution was once filtered. 2 g of silver acetate was added to the filtrate, and the mixture was stirred at room temperature for 2 hours. After the reaction mixture was filtered, one gram of silver acetate was added to the filtrate and the mixture was stirred at room temperature for one hour. After filtration, the solvents in the filtrate were distilled off at 40° C. or lower under reduced pressure. 200 ml of ethyl acetate was added to the residue. The formed crystal was crushed and the mixture was stirred. The formed crystal was recovered by filtration and dissolved in 200 ml of methanol. The solution was filtered through Celite. The filtrate was concentrated under reduced pressure to about 1/5 volume. Ethyl acetate was added to the concentrate to precipitate a crystal. The crystal was recovered by filtration, washed with ethyl acetate and dried to obtain 1.4 g of a yellow powder. Yield: 80%. M.P.: 140°–145° C. * Compound D

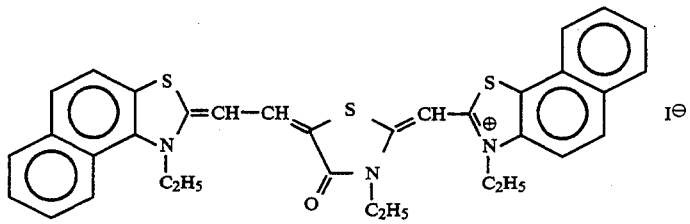

EXAMPLE 6

Synthesis of Compound 32 (Method (1))

One gram of compound F* was dissolved in 1.2 l of a (1:2) mixed solvent of chloroform-methanol with heating, and the solution was filtered. 2 g of silver benzoate was added to the filtrate, and the mixture was stirred at room temperature under light screening conditions for 3 hours and filtered. 2 g of silver benzoate was added to the filtrate, and the mixture was stirred at room temperature for one hour and filtered. The filtrate was concentrated at 40° C. or lower under reduced pressure to about ¼ volume. One gram of silver benzoate was added thereto. The mixture was stirred at room temperature for one hour, then left to stand for one hour and filtered twice through Celite. The filtrate was concentrated to dryness under- reduced pressure. The residue was dissolved in 20 ml of methanol, and 200 ml of ethyl acetate was added thereto to precipitate a crystal. The crystal was recovered by filtration, washed with ethyl acetate and dried to obtain 0.81 g of a brown crystal. Yield: 89%. M.P.: 196°–203° C. * Compound F

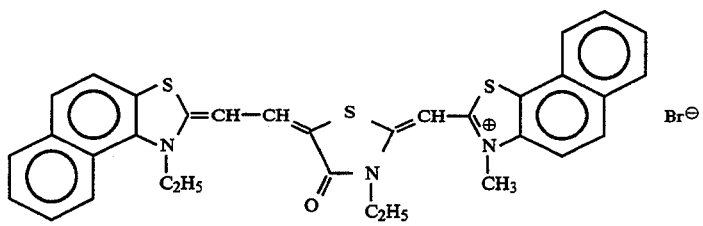

EXAMPLE 7

Synthesis of Compound 31 (Method (1))

1.5 g of compound G* was dissolved in 2 l of a (1:2) mixed solvent of chloroform and methanol, and the solution was filtered. 2.0 g of silver laurate was added to the filtrate, and the mixture was stirred at room temperature for one hour and filtered. The filtrate was concentrated at 40° C. or lower under reduced pressure to about ¼ volume. 1.5 g of silver laurate was added thereto. The mixture was stirred at room temperature for one hour, then left to stand for one hour and filtered through Celite. The filtrate was concentrated and then passed through a short column packed with 50 g of silica gel by using a (4:1) mixed solvent of chloroform-methanol. The resulting dye solution was concentrated to dryness at 40° C. or lower under reduced pressure. The residue was dissolved in 20 ml of a (3:1) mixed solvent of ethanol-chloroform, and 300 ml of ether was added thereto to precipitate a crystal. The crystal was recovered by filtration, washed with ether and dried to obtain 0.85 g of a brown powder. Yield: 51%. M.P.: 123°–150° C. * Compound G

EXAMPLE 8

Synthesis of compound 38 (Method (1))

One gram of compound G was dissolved in 2 l of a (1:1) mixed solvent of chloroform and methanol, and the solution was filtered. 3 g of silver lactate powder was added to the filtrate, and the mixture was vigorously stirred at room temperature under light screening conditions overnight.

The reaction mixture was filtered. 3 g of silver lactate was added to the filtrate. The mixture was concentrated at 40° C. or lower under reduced pressure to about ¼ volume and stirred at room temperature under light screening conditions for 5 hours. The reaction mixture was filtered through Celite. The filtrate was concentrated to dryness under reduced pressure and washed with ethyl acetate. The resulting crystal was dissolved in chloroform and purified by means of silica gel flash column, eluting with a developer solvent of chloroform and methanol (7:1~4:1). The dye solution was collected and filtered. The filtrate was concentrated. The residue was dissolved in a small amount of methanol, and ethyl acetate was added thereto to precipitate a crystal. The crystal was recovered by filtration, washed with ether and dried to obtain 0.75 g of a brown crystal. Yield: 77%. M.P.: 178°–190° C.

EXAMPLE 9

Synthesis of Compound 52 (Method (1))

1.5 g of compound H* was dissolved in 1 l of a (1:1) mixed solvent of chloroform and methanol with heating, and the solution was filtered. 3 g of silver acetate powder was added to the filtrate, and the mixture was stirred at 30° C. under light screening conditions for 5 hours. After filtration, 1.5 g of silver acetate was added to the filtrate, and the mixture was stirred at room temperature for 2 hours. After filtration, the solvents were distilled off at 40° C. or lower under reduced pressure. The residue was washed with ethyl acetate, dissolved in 300 ml of a (1:1) mixed solvent of chloroform and methanol and filtered through Celite. The filtrate was concentrated to dryness. The concentrate was dissolved in 20 ml of methanol, and 300 ml of ethyl acetate was added thereto to precipitate a crystal. The crystal was recovered by filtration, washed with ether and dried to

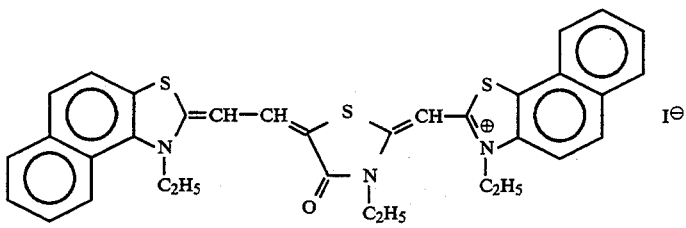

obtain 1.3 g of a brown crystal. Yield: 97%. M.P.: 177°–182° C. * Compound H

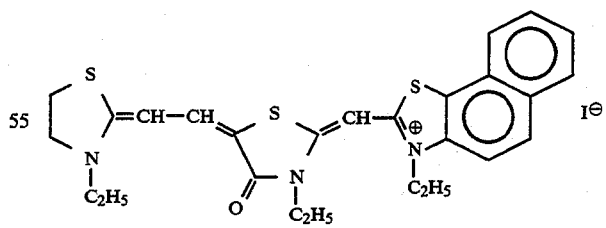

EXAMPLE 10

Synthesis of Compound 166 (Method (1))

To a suspension of 3.5 g of Compound I* in 600 ml of chloroform, 2 g of silver acetate was added with stirring at room temperature.

After 1 hour, the reaction mixture was filtered through Celite and the filtrate was dried under reduced pressure. To this residue 50 ml of chloroform and then 1 l of ethyl acetate were added.

The product precipitated was collected by suction filtration and washed with ethyl acetate. After drying, 2.55 g of pure Compound 166 was obtained in a yield of 82% with a melting point of 189° to 190° C. (decomp.) $\lambda_{max}^{MeOH}$ 671 nm ($\epsilon_{max}$=7.13×10$^4$). *Compound I Nos. 2,504,468, 3,335,010, 2,961,318, 2,454,629, 2,430,295 and 2,388,963, British Patents 487,051 and 489,335 and E. B. Knott, R. H. Jeffreys, J. Chem. Soc., 4762 (1952), ibid., 949 (1955).

While criteria for identifying the compounds of the present invention have been described hereinbefore, the following data confirm that compound 52 is formed in this.

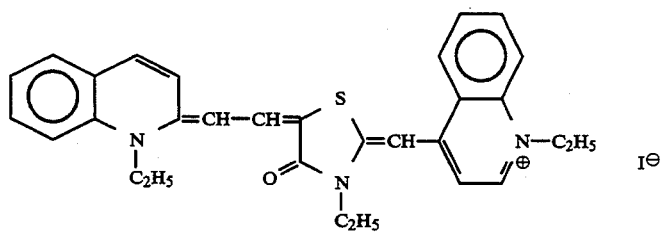

EXAMPLE 11

Synthesis of Compound 166 (Method (4))

A column for chromatography was packed with 100 g of an ion-exchange resin (DIAION WA-21, a product of Mitsubishi Kasei Corporation) and 1 l of 1N-sodium hydroxide/methanol solution and 1 l of 0.5N-acetic acid/methanol solution were passed through the column in this order for the pre-treatment.

A solution of 7 g of compound J* dissolved in 1 l of 1N-acetic acid/methanol solution was passed through the pre-treated column. The dye solution eluted was concentrated under reduced pressure to the amount of about 200 ml and then 0.7 l of ethyl acetate was added to the concentrate to precipitate a crystal. The crystal was recovered by filtration with suction, washed with ethyl acetate and dried to obtain 5.0 g of Compound 166. Yield: 84%. *Compound J Mass spectrum (Fab. Nega.) matrix TEA I⊖127 completely disappeared ⊖OCOCH$_3$ 59 Beilstein test (flame reaction): negative Mass spectrum (Fab. Posi.) matrix TEA 494 (M-OCOCH$_3$)+$^1$H-NMR (400 MHz; DMSO-d$_6$)

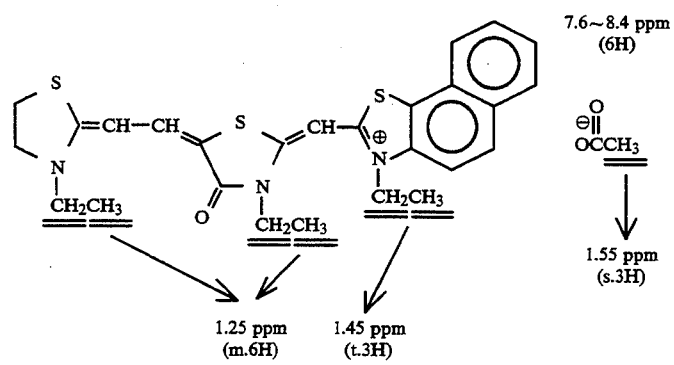

Elemental analysis

| | (C$_{28}$H$_{31}$O$_3$N$_3$S$_3$.3H$_2$O) | | | |
|---|---|---|---|---|
| | C | H | N | S |
| Calcd. | 55.36 | 6.14 | 6.91 | 15.83 |
| Found | 55.37 | 6.05 | 6.73 | 16.01 |

UV-VIS spectrum (methanol) $\lambda$max 562 nm ($\epsilon$=8.17×10$^4$)

$^1$H-NMR and mass spectrum data for compounds 53, 128, 25 and 32 are shown below.

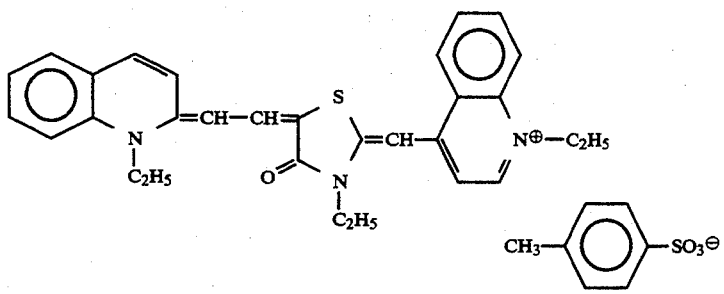

The compounds A to J as shown above can be easily synthesized in the same manner as described in U.S. Pat.

Compound 53

$^1$H-NMR (200 MHz; DMSO-d$_6$)

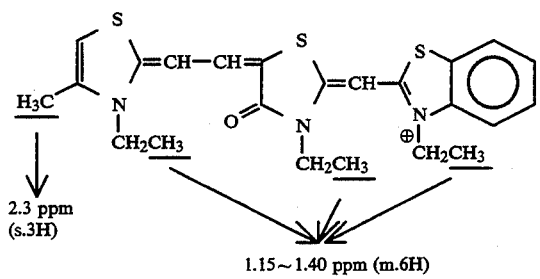

Mass spectrum (Fab. Posi.) 456 (M-CH$_3$COO)$^+$(Fab. Nega.) 59 CH$_3$COO$^-$

Compound 128

$^1$H-NMR (200 MHz; methanol-d$_4$)

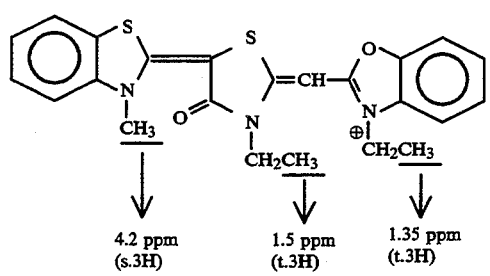

Mass spectrum (Fab. Posi.) 436 (M-CH$_3$COO)$^+$(Fab. Nega.) 59 CH$_3$COO$^-$

Compound 25

$^1$H-NMR (200 MHz; DMSO-d$_6$)

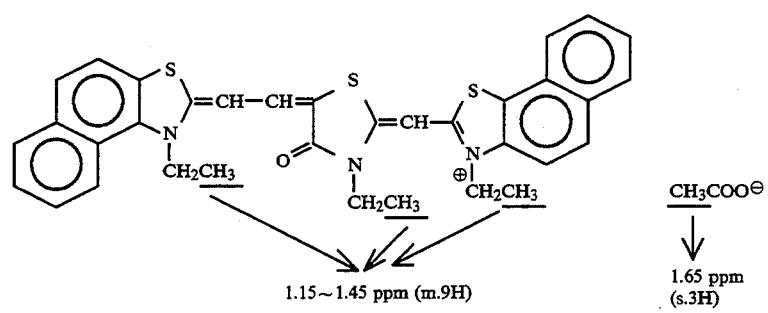

Mass spectrum (Fab. Posi.) 592 (M-CH$_3$COO)$^+$(Fab. Nega.) 59 CH$_3$COO$^-$

Compound 32

$^1$H-NMR (200 MHz; DMSO-d$_6$)

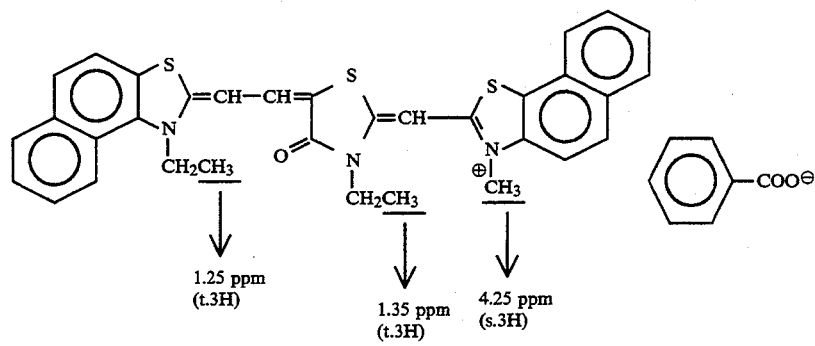

Mass spectrum (Fab. Posi.)

578 (M—⟨benzene⟩—COO)$^+$

121 ⟨benzene⟩—COO$^-$

While the synthesis of specific compounds of the present invention has been described in detail above, other compounds could be easily synthesized in the same manner as described above.

In the following table, the synthesis methods (1) to (4), the maximum absorption wavelengths (λmax) of ultraviolet visible absorption spectrums and the molecular extinction coefficients ($\epsilon$) for the compounds of the present invention are shown.

| Compound No. | Synthesis Method | Ultraviolet Visible Absorption $\lambda_{max}^{methanol}(\epsilon)$ (nm) |
|---|---|---|
| 1 | (1) | 596 (9.80 × 10$^4$) |
| 2 | (1) | 601 (9.86 × 10$^4$) |
| 3 | (1) | 592 (9.95 × 10$^4$) |
| 4 | (1) | 584 (9.90 × 10$^4$) |
| 5 | (1) | 606 (1.05 × 10$^5$) |
| 6 | (1) | 615 (1.00 × 10$^5$) |
| 7 | (1) | 595 (1.03 × 10$^5$) |
| 8 | (1) | 597 (9.60 × 10$^4$) |
| 9 | (1) | 595 (1.04 × 10$^5$) |
| 10 | (1) | 594 (9.81 × 10$^4$) |
| 11 | (2) | 603 (9.80 × 10$^4$) |
| 12 | (1) | 613 (1.02 × 10$^5$) |
| 13 | (1) | 598 (9.98 × 10$^4$) |
| 14 | (1) | 607 (1.10 × 10$^5$) |
| 15 | (1) | 590 (9.70 × 10$^4$) |
| 16 | (1) | 514 (9.77 × 10$^4$) |
| 17 | (1) | 625 (1.02 × 10$^5$) |
| 18 | (1) | 612 (1.07 × 10$^5$) |
| 19 | (1) | 620 (1.10 × 10$^5$) |
| 20 | (1) | 616 (1.00 × 10$^5$) |
| 21 | (1) | 624 (1.20 × 10$^5$) |
| 22 | (1) | 616 (1.03 × 10$^5$) |
| 23 | (1) | 616 (8.01 × 10$^4$) |
| 24 | (1) | 620 (9.75 × 10$^4$) |
| 25 | (1) | 620 (1.03 × 10$^5$) |
| 26 | (1) | 622 (1.10 × 10$^5$) |
| 27 | (1) | 623 (9.95 × 10$^4$) |
| 28 | (1) | 622 (1.03 × 10$^5$) |
| 29 | (1) | 620 (1.02 × 10$^5$) |
| 30 | (1) | 620 (9.74 × 10$^4$) |
| 31 | (1) | 621 (1.13 × 10$^5$) |
| 32 | (1) | 623 (1.05 × 10$^5$) |
| 33 | (1) | 622 (9.98 × 10$^4$) |
| 34 | (1) | 623 (9.30 × 10$^4$) |
| 35 | (1) | 625 (9.73 × 10$^4$) |
| 36 | (1) | 622 (1.08 × 10$^5$) |
| 37 | (1) | 622 (9.80 × 10$^4$) |
| 38 | (1) | 621 (1.05 × 10$^5$) |
| 39 | (1) | 621 (9.55 × 10$^4$) |
| 40 | (1) | 623 (1.06 × 10$^5$) |
| 41 | (1) | 618 (9.25 × 10$^4$) |
| 42 | (3) | 635 (7.00 × 10$^4$) |
| 43 | (1) | 675 (7.84 × 10$^4$) |
| 44 | (1) | 555 (7.55 × 10$^4$) |
| 45 | (1) | 562 (8.01 × 10$^4$) |
| 46 | (1) | 554 (8.15 × 10$^4$) |
| 47 | (1) | 563 (7.70 × 10$^4$) |
| 48 | (2) | 557 (8.60 × 10$^4$) |
| 49 | (1) | 558 (8.53 × 10$^4$) |
| 50 | (1) | 556 (8.18 × 10$^4$) |
| 51 | (1) | 563 (7.50 × 10$^4$) |
| 52 | (1) | 562 (8.17 × 10$^4$) |
| 53 | (1) | 606 (7.70 × 10$^4$) |
| 53 | (2) | 605 (7.35 × 10$^4$) |
| 53 | (3) | 606 (7.49 × 10$^4$) |
| 54 | (1) | 606 (7.90 × 10$^4$) |
| 55 | (3) | 618 (8.20 × 10$^4$) |
| 56 | (1) | 617 (9.33 × 10$^4$) |
| 57 | (1) | 614 (7.99 × 10$^4$) |
| 58 | (1) | 607 (8.80 × 10$^4$) |
| 59 | (2) | 614 (9.50 × 10$^4$) |
| 60 | (1) | 620 (9.39 × 10$^4$) |
| 61 | (1) | 627 (9.94 × 10$^4$) |
| 62 | (1) | 566 (9.53 × 10$^4$) |
| 63 | (1) | 575 (9.22 × 10$^4$) |
| 64 | (1) | 612 (1.03 × 10$^5$) |
| 65 | (1) | 572 (1.00 × 10$^5$) |
| 66 | (1) | 578 (9.77 × 10$^4$) |
| 67 | (1) | 583 (9.49 × 10$^4$) |
| 68 | (1) | 582 (9.30 × 10$^4$) |
| 69 | (1) | 566 (9.91 × 10$^4$) |
| 70 | (3) | 572 (1.08 × 10$^5$) |
| 71 | (1) | 566 (1.05 × 10$^5$) |
| 72 | (2) | 576 (1.10 × 10$^5$) |
| 73 | (1) | 599 (9.44 × 10$^4$) |
| 74 | (1) | 605 (8.30 × 10$^4$) |
| 75 | (1) | 577 (6.35 × 10$^4$) |
| 76 | (1) | 588 (6.40 × 10$^4$) |
| 77 | (1) | 585 (9.63 × 10$^4$) |
| 78 | (1) | 582 (9.43 × 10$^4$) |
| 79 | (1) | 567 (9.22 × 10$^4$) |
| 80 | (1) | 573 (7.75 × 10$^4$) |
| 81 | (1) | 583 (7.57 × 10$^4$) |
| 82 | (1) | 600 (9.94 × 10$^4$) |
| 83 | (1) | 599 (1.00 × 10$^5$) |
| 84 | (1) | 614 (7.34 × 10$^4$) |
| 85 | (1) | 634 (8.05 × 10$^4$) |
| 86 | (1) | 602 (9.88 × 10$^4$) |
| 87 | (3) | 590 (9.72 × 10$^4$) |
| 88 | (1) | 560 (8.73 × 10$^4$) |
| 89 | (1) | 610 (1.05 × 10$^5$) |
| 90 | (1) | 561 (9.88 × 10$^4$) |
| 91 | (1) | 568 (8.38 × 10$^4$) |
| 92 | (1) | 593 (9.82 × 10$^4$) |
| 93 | (1) | 545 (9.20 × 10$^4$) |
| 94 | (1) | 568 (8.54 × 10$^4$) |
| 95 | (3) | 604 (9.30 × 10$^4$) |
| 96 | (1) | 624 (9.91 × 10$^4$) |
| 97 | (1) | 602 (9.73 × 10$^4$) |
| 98 | (1) | 627 (9.57 × 10$^4$) |
| 99 | (1) | 634 (9.60 × 10$^4$) |
| 100 | (1) | 677 (1.30 × 10$^5$) |
| 101 | (1) | 660 (1.12 × 10$^5$) |
| 102 | (1) | 720 (8.56 × 10$^4$) |
| 103 | (1) | 638 (6.60 × 10$^4$) |
| 104 | (1) | 654 (5.53 × 10$^4$) |
| 105 | (1) | 652 (7.57 × 10$^4$) |
| 106 | (1) | 593 (5.38 × 10$^4$) |
| 107 | (1) | 591 (6.71 × 10$^4$) |
| 108 | (1) | 499 (7.05 × 10$^4$) |
| 109 | (1) | 501 (6.88 × 10$^4$) |
| 110 | (1) | 503 (7.33 × 10$^4$) |
| 111 | (1) | 509 (7.11 × 10$^4$) |
| 112 | (1) | 519 (6.30 × 10$^4$) |
| 113 | (1) | 509 (7.10 × 10$^4$) |
| 114 | (1) | 501 (7.80 × 10$^4$) |
| 115 | (1) | 505 (7.31 × 10$^4$) |
| 116 | (1) | 496 (6.60 × 10$^4$) |
| 117 | (1) | 510 (7.39 × 10$^4$) |
| 118 | (1) | 510 (8.80 × 10$^4$) |
| 119 | (1) | 510 (7.22 × 10$^4$) |
| 120 | (1) | 505 (6.97 × 10$^4$) |
| 121 | (1) | 514 (7.80 × 10$^4$) |
| 122 | (1) | 480 (6.15 × 10$^4$) |
| 123 | (1) | 484 (7.48 × 10$^4$) |
| 124 | (1) | 481 (7.07 × 10$^4$) |
| 125 | (1) | 485 (6.58 × 10$^4$) |
| 126 | (1) | 491 (6.01 × 10$^4$) |
| 127 | (1) | 490 (6.64 × 10$^4$) |
| 128 | (1) | 484 (7.19 × 10$^4$) |
| 129 | (3) | 485 (7.30 × 10$^4$) |
| 130 | (1) | 488 (7.22 × 10$^4$) |
| 131 | (1) | 489 (7.44 × 10$^4$) |
| 132 | (1) | 488 (7.91 × 10$^4$) |
| 133 | (1) | 487 (8.13 × 10$^4$) |
| 134 | (1) | 421 (7.00 × 10$^4$) |
| 135 | (1) | 492 (8.98 × 10$^4$) |
| 136 | (1) | 492 (6.89 × 10$^4$) |
| 137 | (1) | 481 (8.10 × 10$^4$) |
| 138 | (1) | 501 (6.45 × 10$^4$) |
| 139 | (1) | 505 (5.41 × 10$^4$) |
| 140 | (1) | 511 (5.32 × 10$^4$) |
| 141 | (1) | 477 (6.12 × 10$^4$) |
| 142 | (1) | 473 (5.83 × 10$^4$) |
| 143 | (1) | 495 (4.50 × 10$^4$) |
| 144 | (3) | 549 (5.05 × 10$^4$) |
| 145 | (1) | 510 (6.08 × 10$^4$) |
| 146 | (1) | 568 (6.33 × 10$^4$) |
| 147 | (1) | 545 (6.74 × 10$^4$) |
| 148 | (1) | 706 (1.00 × 10$^5$) |
| 149 | (1) | 710 (8.03 × 10$^4$) |
| 150 | (1) | 658 (8.81 × 10$^4$) |
| 151 | (1) | 702 (1.03 × 10$^5$) |
| 152 | (1) | 659 (7.15 × 10$^4$) |
| 153 | (1) | 702 (6.52 × 10$^4$) |

-continued

| Compound No. | Synthesis Method | Ultraviolet Visible Absorption $\lambda_{max}^{methanol}(\epsilon)$ (nm) |
|---|---|---|
| 154 | (1) | 734 (6.35 × 10⁴) |
| 155 | (1) | 658 (1.05 × 10⁵) |
| 156 | (1) | 525 (5.30 × 10⁴) |
| 157 | (1) | 517 (6.10 × 10⁴) |
| 158 | (1) | 716 (9.85 × 10⁴) |
| 159 | (1) | 659 (1.10 × 10⁵) |
| 160 | (1) | 681 (1.20 × 10⁵) |
| 161 | (1) | 666 (1.21 × 10⁵) |
| 162 | (1) | 614 (7.51 × 10⁴) |
| 163 | (1) | 587 (6.33 × 10⁴) |
| 164 | (1) | 627 (1.03 × 10⁵) |
| 165 | (1) | 625 (1.09 × 10⁵) |
| 166 | (1) and (4) | 671 (7.13 × 10⁴) |

The solubility of the compounds of the present invention in solvents is illustrated below.

As mentioned above, conventional cationic cyanine dyes having a counter anion (for example, p-toluenesulfonate, iodide, bromide and perchlorate) usually used, in particularly cationic rhodacyanine dyes have low solubility in water (see Tables 1 and 2 below). The compounds of the present invention are surprisingly improved in this property, that is, solubility, by replacing the counter anion with the organic carboxylate anion without changing the dye moiety at all.

The solubility of some of the compounds within formula (I) was accurately measured. The results are shown in Tables 1 and 2.

The measurement of solubility was made in the following manner. The compound was dissolved at 37° C. in an incubator for 12 hours, the solution was filtered through a microfilter (0.45 μ pore size), and the filtrate was diluted with methanol and the solubility was determined by using visible absorption.

TABLE 1

Change in Solubility due to Change of Counter Ion
($I^{\ominus}$ v.s. $CH_3COO^{\ominus}$)

Structure of Dye Moiety

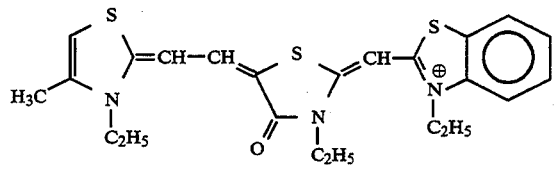

| Name of Compound | Compound A* | | Compound 53 | |
|---|---|---|---|---|
| Anion Moiety | $I^{\ominus}$ | | $CH_3COO^{\ominus}$ | |
| Solvent | mmol/l | mg/ml | mmol/l | mg/ml |
| H₂O | 0.17 | 0.10 | >37 | >19 |
| MeOH | 1.11 | 0.65 | >33 | >17 |
| PEG400 | 2.33 | 1.36 | >44 | >23 |
| DMSO | 20.0 | 11.7 | 26.8 | 13.8 |
| DMF | 7.00 | 4.08 | >30 | >15 |

*See Example 1 above.

Structure od Dye Moiety

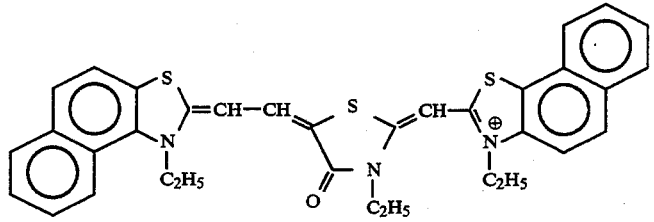

| Name of Compound | Compound E* | | Compound 25 | |
|---|---|---|---|---|
| Anion Moiety | $I^{\ominus}$ | | $CH_3COO^{\ominus}$ | |
| Solvent | mmol/l | mg/ml | mmol/l | mg/ml |
| H₂O | 0.00 | 0.00 | 10.1 | 6.56 |
| MeOH | 0.03 | 0.03 | >25 | >16 |
| PEG400 | 0.08 | 0.06 | 19.9 | 13.0 |
| DMSO | 2.92 | 2.10 | 6.56 | 4.28 |
| DMF | 1.42 | 1.02 | 7.20 | 4.69 |

*See Example 5 above.

TABLE 2

Change in Solubility due to Change of Counter Ion
($I^{\ominus}$ v.s. $CH_3COO^{\ominus}$)

Structure of Dye Moiety

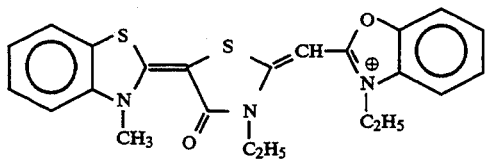

| Name of Compound | Compound D* | Compound 128 |
|---|---|---|
| Anion Moiety | $I^{\ominus}$ | $CH_3COO^{\ominus}$ |
| Solvent | Solubility (mg/ml) | |
| $H_2O$ | 0.2 | >10 |
| MeOH | 2.0 | >10 |

*See Example 4 above.

Structure of Dye Moiety

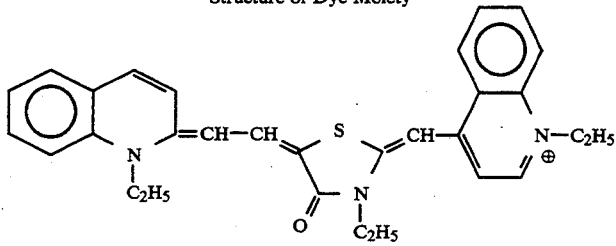

| Name of Compound | Compound | Compound 43 |
|---|---|---|
| Anion Moiety | $I^{\ominus}$ | $CH_3COO^{\ominus}$ |
| Solvent | Solubility (mg/ml) | |
| $H_2O$ | 0.3 | >10 |
| MeOH | 2.8 | >10 |

Structure of Dye Moiety

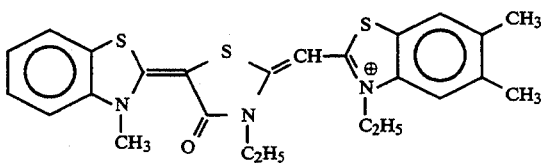

| Name of Compound | Compound | Compound 110 |
|---|---|---|
| Anion Moiety | $I^{\ominus}$ | $CH_3COO^{\ominus}$ |
| Solvent | Solubility (mg/ml) | |
| $H_2O$ | ~0 | 1.7 |
| MeOH | 0.1 | >10 |

Structure of Dye Moiety

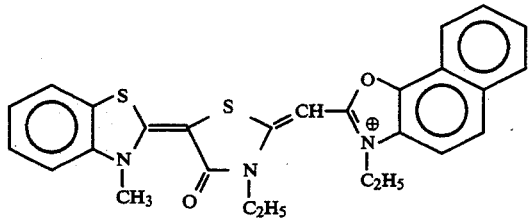

| Name of Compound | Compound | Compound 134 |
|---|---|---|
| Anion Moiety | $I^{\ominus}$ | $CH_3COO^{\ominus}$ |
| Solvent | Solubility (mg/ml) | |
| $H_2O$ | ~0 | 6.9 |
| MeOH | 0.15 | >10 |

It is apparent from the solubility data of the compounds shown in Tables 1 and 2 that the compounds of the present invention formed by organic carboxylate anionizing the anion moiety are surprisingly highly water-soluble. All of the compounds of the present invention which are not indicated in Tables 1 and 2 are also highly water-soluble.

TABLE 3

Solubility of Acetate Anion in Water

| Compound | Solubility (mg/ml) |
| --- | --- |
| 3 | 7.2 |
| 7 | 6.2 |
| 9 | 3.8 |
| 10 | >10 |
| 33 | 5.3 |
| 34 | 7.1 |
| 35 | >10 |
| 36 | 4.8 |
| 45 | >10 |
| 98 | 6.8 |
| 104 | 4.1 |
| 127 | 5.7 |
| 145 | 8.8 |
| 147 | 8.1 |
| 148 | 3.2 |
| 150 | 2.1 |
| 153 | 1.4 |
| 156 | 3.7 |

The solubility of a dye having an iodide anion in water, which dye corresponds to each dye as shown in Table 3 was up to 0.1 mg/ml. It is apparent from the data as shown above that the present invention is effective for the improvement in water solubility.

Further, the compounds of the present invention are greatly improved in solubility in other solvents such as methanol in addition to water. Accordingly, it will be understood that the addition of the compounds of the present invention to photographic systems can be made with ease beyond comparison with conventional compounds.

The application of the compounds of the present invention to photographic systems is illustrated below.

The methine compounds represented by general formula (I) according to the present invention can be added to silver halide emulsions in the form of an aqueous solution. In addition, the compounds can be added to the emulsions by conventional methods. For example, the compounds can be directly dispersed in the emulsions, or may be dissolved in a solvent such as methyl alcohol, ethyl alcohol, methyl cellosolve or 2,2,3,3-tetrahydrofluoropropanol or a mixture thereof and may be added to the emulsions.

Sensitizing dyes of the present invention may be dissolved by using ultrasonic vibration as described in U.S. Pat. No. 3,485,634. Alternatively, the sensitizing dyes of the present invention can be added to the emulsions by dissolving or dispersing them by methods described in U.S. Pat. Nos. 3,482,981, 3,585,195, 3,469,987, 3,425,835 and 3,342,605, U.K. Patents 1,271,329, 1,038,029 and 1,121,174, U.S. Pat. Nos. 3,660,101 and 3,658,546.

The compounds represented by general formula (I) according to the present invention are incorporated in a photographic silver halide emulsion in an amount of $5 \times 10^{-7}$ to $5 \times 10^{-3}$ mol, preferably $5 \times 10^{-6}$ to $2 \times 10^{-3}$ mol, particularly preferably $1 \times 10^{-5}$ to $1 \times 10^{-3}$ mol of the compound per mol of silver halide in the emulsion.

Any of silver bromide, silver iodobromide, silver iodochlorobromide, silver chlorobromide and silver chloride can be used as silver halide for the photographic emulsions of the present invention. Among these silver halides, silver bromide, silver chlorobromide, silver iodochloride and silver iodochlorobromide are preferred.

The crystal form of silver halide grains, grain sizes, methods for preparing silver halide emulsions, chemical sensitization methods, etc. described in JP-A-62-269949 (page 6, left upper column line 5 through page 7 left lower column line 3) (corresponding to U.S. Pat. No. 4,818,674) can be applied to the silver halide emulsion of the present invention. Further, anti-fogging agents and stabilizers for photographic silver halide emulsions, dimensional stabilizers for photographic materials, the application of polyalkylene oxide compounds to photographic materials, color couplers, coating aids, surfactants for imparting antistatic properties, improving slipperiness and emulsifying dispersion and preventing sticking from being caused, hardening agents, color fogging inhibitors, protective colloids, exposure methods, the use of photographic materials using silver halide emulsions, the photographic processing of photographic materials, etc. described in JP-A-62-269949 (page 10 left upper column line 15 through page 12 left lower column line 14) can be applied to the present invention.

In addition, the photographic emulsions of the present invention can be preferably used in photographic materials for neon helium laser.

Example of Photographic Silver Halide Emulsion

EXAMPLE 12

A silver halide emulsion comprising pure silver bromide and having a cubic crystal form (the area ratio of the [1,0,0] plane to the entire surface area of grain being 92%) was prepared and subjected to a sulfur sensitization treatment. The average diameter of silver halide grains contained in the emulsion was 0.68 μm, and 0.74 mol of silver halide per kg of emulsion was contained in the emulsion. One kg of the emulsion was weighed in each of pots. An aqueous solution of each of the compounds of formula (I) indicated in Tables 4 and 5 was added to the pot, and the mixture was mixed with stirring at 40° C. For the purpose of comparison, comparative compounds 1 and 2 wherein counter ion was iodide were dispersed in water and added to respective pots.

Further, 4-hydroxy-6-methyl-1,3,3a,7-tetraazaindene in an amount of 0.1 g/kg of emulsion, sodium salt of 2,4-dichloro-6-hydroxy-1,3,5-triazine in an amount of 0.1 g/kg of emulsion and sodium dodecylbenzenesulfonate in an amount of 0.1 g/kg of emulsion in order were added thereto. The emulsion was then coated on a polyethylene terephthalate film to obtain a photographic material.

Each of these samples was exposed through an optical wedge for 5 seconds by using a yellow filter (SC-50, a product of Fuji Photo Film Co., Ltd.) or a red filter (SC-60, a product of Fuji Photo Film Co., Ltd.) and tungsten light (5400° K.).

A spectrogram was obtained by using a grating spectrograph having a tungsten light source of 2666° K., and the maximum sensitization was measured.

After exposure, the samples were developed at 20° C for 4 minutes by using the following developing solution. The density of each of the developed films was measured by using a densitometer (manufactured by Fuji Photo Film Co., Ltd. Spectral sensitivity, that is, yellow filter sensitivity (SY) or red filter sensitivity (SR), sensitivity (SB) in the sensitive region inherent in silver halide, and fog were determined. Sensitivity was determined when the standard point of optical density was referred to as (Fog+0.2). Composition of Developing Solution

| | |
|---|---|
| Water | 700 ml |
| Metol | 3.1 g |
| Anhydrous sodium sulfite | 45 g |
| Hydroquinone | 12 g |
| Sodium carbonate monohydrate | 79 g |
| Potassium bromide | 1.9 g |
| Add water | to make 1 liter |

Two volumes of water were added thereto to obtain a working solution when used.

The results are shown in Tables 4 and 5.

It will be understood from Tables 4 and 5 that the compounds of the present invention in the form of an aqueous solution can be added to the emulsion and the compounds of the present invention have excellent characteristics as sensitizing dyes for silver halide photographic materials.

It is apparent that the comparative compounds 1 and 2 used for the purpose of comparison have low solubility in water and the desired spectral sensitivity cannot be obtained when the comparative compounds in the form of an aqueous dispersion are added.

TABLE 4

| Test No. | Compound [I] and Amount Used ($\times 10^{-4}$ mol/kg of Emulsion) | SY | Fog | Maximum Sensitization (nm) |
|---|---|---|---|---|
| 1 | — | — | — | 0.03 | — |
| 2 | 142 | 2.2 | 300 | 0.03 | 495 |
| 3 | 134 | 2.2 | 1350 | 0.04 | 520 |
| 4 | 133 | 2.2 | 1620 | 0.04 | 520 |
| 5 | 111 | 1.1 | 2085 | 0.04 | 540 |
| 6 | 88 | 2.2 | 2085 | 0.03 | 565 |
| 7 | 91 | 1.1 | 1730 | 0.03 | 600 |
| 8 | 89 | 0.55 | 705 | 0.03 | 640 |
| 9 | 86 | 0.55 | 890 | 0.03 | 630 |
| Comp. Ex. 10 | Comparative Compound 1 | 0.55 | 100 | 0.03 | 638 |

TABLE 5

| Test No. | Compound [I] and Amount Used ($\times 10^{-5}$ mol/kg of Emulsion) | SR | Fog | Maximum Sensitization (nm) |
|---|---|---|---|---|
| 1 | — | — | — | 0.03 | — |
| 2 | 96 | 11 | 3600 | 0.03 | 660 |
| 3 | 101 | 5.5 | 2270 | 0.03 | 695 |
| 4 | 150 | 11 | 905 | 0.03 | 695 |
| 5 | 100 | 2.2 | 1685 | 0.03 | 715 |
| 6 | 151 | 4.4 | 1535 | 0.03 | 750 |
| Comp. Ex. 7 | Comparative Compound 2 | 4.4 | 100 | 0.03 | 747 |

Comparative Compound 1

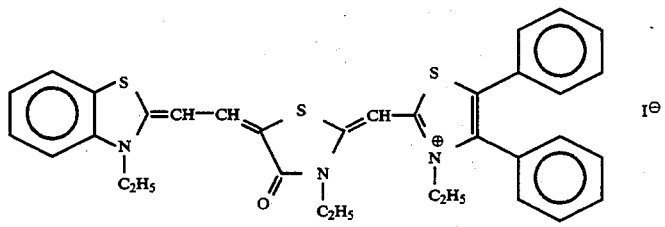

Comparative Compound 2

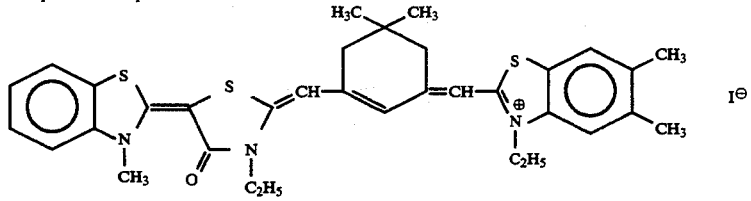

Since the methine compounds of the present invention have an organic carboxylate anion as a counter anion, they are surprisingly highly water-soluble in comparison with conventional compounds. Accordingly, the aqueous solutions of the sensitizing dyes can be easily prepared and the dyes can be used in the form of an aqueous solution.

Particularly, when the aqueous solutions of the methine compounds are added to photographic silver halide emulsions, solutions having a high concentration can be prepared and the spectral sensitization of silver halide can be advantageously made.

While the invention has been described in detail and with reference to specific embodiments thereof, it will be apparent to one skilled in the art that various changes and modifications can be made therein without departing from the spirit and scope thereof.

What is claimed is:

1. A water-soluble methine compound represented by

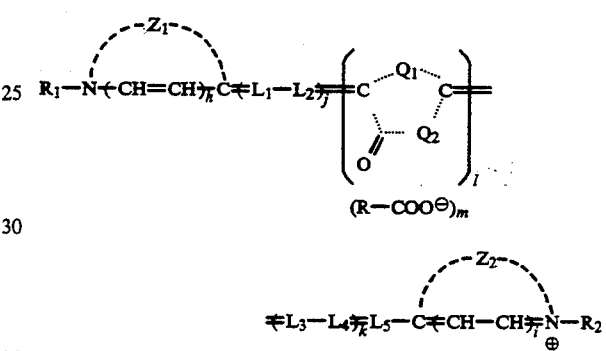

wherein $Z_1$ and $Z_2$ each independently represents a non-metallic atomic group required for forming a 5-membered or 6-membered nitrogen-containing heterocyclic ring selected from the group consisting of a thiazole, a benzothiazole, a naphthothiazole, an oxazole, a benzoxazole, a naphthoxazole, a selenazole, a benzoselenazole, a naphthoselenazole, a tellurazole, a benzotellurazole, a naphthotellurazole, a thiazoline, an oxazoline, an isoxazole, a benzisoxazole, a dialkylindolenine, a pyridine, a quinoline, a naphthridine, a tetrazole, an imidazoquinoxaline, and a dioxodihydronaphthoimidazole; $R_1$ and $R_2$ each independently represents a methyl group, an ethyl group, a vinylmethyl group or a hydroxyethyl group; $Q_1$ represents a sulfur atom and $Q_2$ represents a nitrogen atom; $L_1$, $L_2$, $L_3$, $L_4$ and $L_5$ each represents an unsubstituted methine group; R represents a hydroxymethyl group, a hydroxyethyl group, a hydroxyvinyl group, a carboxymethyl group, a carboxyethyl group, a carboxyvinyl group, a phenyl group, a carboxyphenyl group, a hydroxyphenyl group, a pyridyl group, or a 2,4-dihydroxy-pyrimidine-6-yl group; m represents 1; i and h each represents 0 or 1; l represents 1 or 2; and j and k each represents 0, 1, 2 or 3.

2. The water-soluble methine compound according to claim 1, wherein the compound is represented by

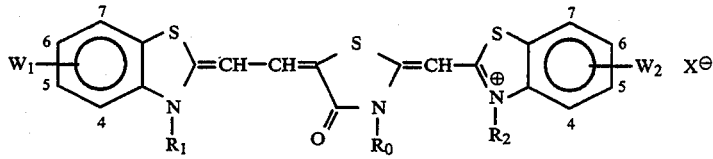

wherein each of $W_1$ and $W_2$ is hydrogen, each of $R_1$, $R_0$, and $R_2$ is methyl, and $X^\ominus$ is

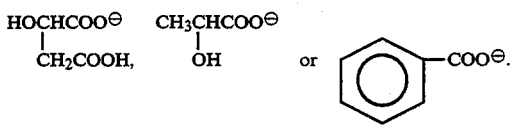

3. The water-soluble methine compound according to claim 1 wherein $R_1$ and $R_2$ each independently represents a methyl group or an ethyl group.

4. The water-soluble methine compound according to claim 1 wherein $Z_1$ and $Z_2$ each independently represents a non-metallic atomic group required for forming a benzothiazole or a naphthothiazole.

5. The water-soluble methine compound according to claim 1 wherein R represents a phenyl group.

6. The water-soluble methine compound according to claim 1, wherein the compound is represented by

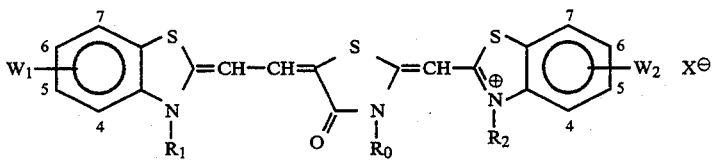

wherein $W_1$ and $W_2$ each independently represents a hydrogen atom, a methyl group, a chlorine atom, a trifluoromethyl ($CF_3$) group, an ethoxy group or a benzo group (to be condensed), $R_1$ and $R_2$ each independently represents a methyl group or an ethyl group, $R_0$ represents a methyl group or an ethyl group, and $X^\ominus$ represents $$\underset{CH_2COOH,}{HOCHCOO^\ominus} \quad \underset{OH}{CH_3CHCOO^\ominus} \quad \text{or} \quad \text{[phenyl]}-COO^\ominus.$$

* * * * *